(12) United States Patent
Kikuchi

(10) Patent No.: US 8,924,657 B2
(45) Date of Patent: Dec. 30, 2014

(54) INFORMATION PROCESSING APPARATUS, DATA ACCESS SYSTEM, AND CONTROL METHOD FOR THE SAME

(75) Inventor: Toru Kikuchi, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 1077 days.

(21) Appl. No.: 12/770,264

(22) Filed: Apr. 29, 2010

(65) Prior Publication Data

US 2010/0312974 A1  Dec. 9, 2010

(30) Foreign Application Priority Data

Jun. 4, 2009  (JP) .................................. 2009-135355

(51) Int. Cl.
- G06F 12/00 (2006.01)
- G06F 3/06 (2006.01)
- G11B 27/034 (2006.01)
- G11B 27/34 (2006.01)

(52) U.S. Cl.
CPC ............ *G06F 3/0656* (2013.01); *G06F 3/0611* (2013.01); *G06F 3/0673* (2013.01); *G11B 27/034* (2013.01); *G11B 27/34* (2013.01)
USPC .................................. 711/154; 711/E12.001

(58) Field of Classification Search
None
See application file for complete search history.

(56) References Cited

FOREIGN PATENT DOCUMENTS

| JP | 11-024981 | 1/1999 |
|---|---|---|
| JP | 11-024982 | 1/1999 |
| JP | 11-149405 | 6/1999 |
| JP | 2001-101061 | 4/2001 |
| JP | 2003-030037 | 1/2003 |
| JP | 2007-140985 | 6/2007 |

*Primary Examiner* — Charles Rones
*Assistant Examiner* — Ryan Dare
(74) *Attorney, Agent, or Firm* — Cowan, Liebowitz & Latman, P.C.

(57) ABSTRACT

A data storage apparatus acquires rule information that is used by the external device when performing data access and that defines a relation between the type of access operation and a data read condition, and status information including information for specifying data currently displayed on the external device, and indicates a current display status of the external device. Then, the data storage apparatus determines data to be pre-read from a storage medium and stored in a temporary data storage unit based on the rule information and the status information, and reads the determined data from the storage medium, and stores the read data in a temporary data storage unit. In the case where a data access request is received from the external device, if the requested data is stored in the temporary data storage unit, the requested data is read from the temporary data storage unit, and is output.

14 Claims, 28 Drawing Sheets

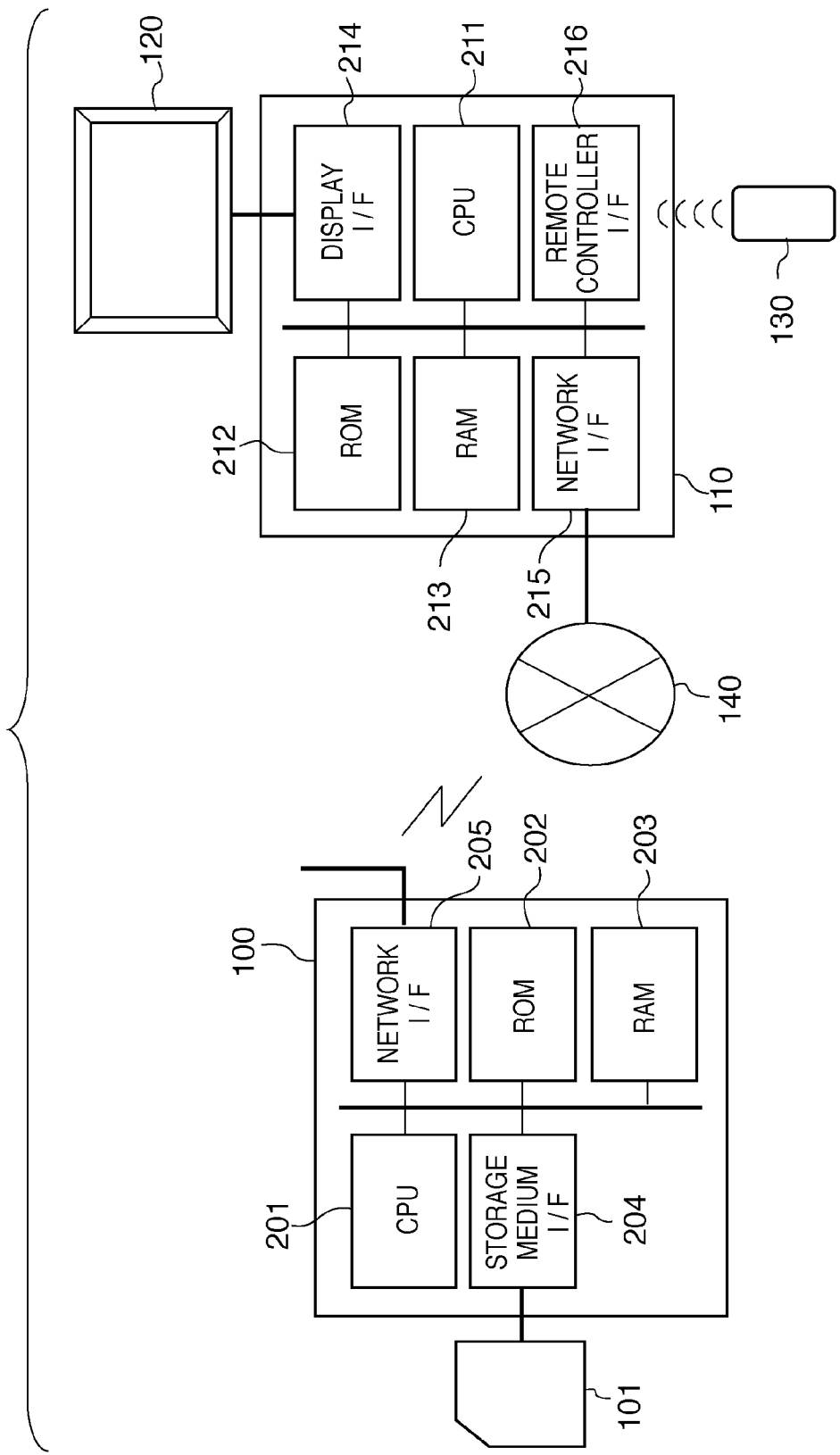

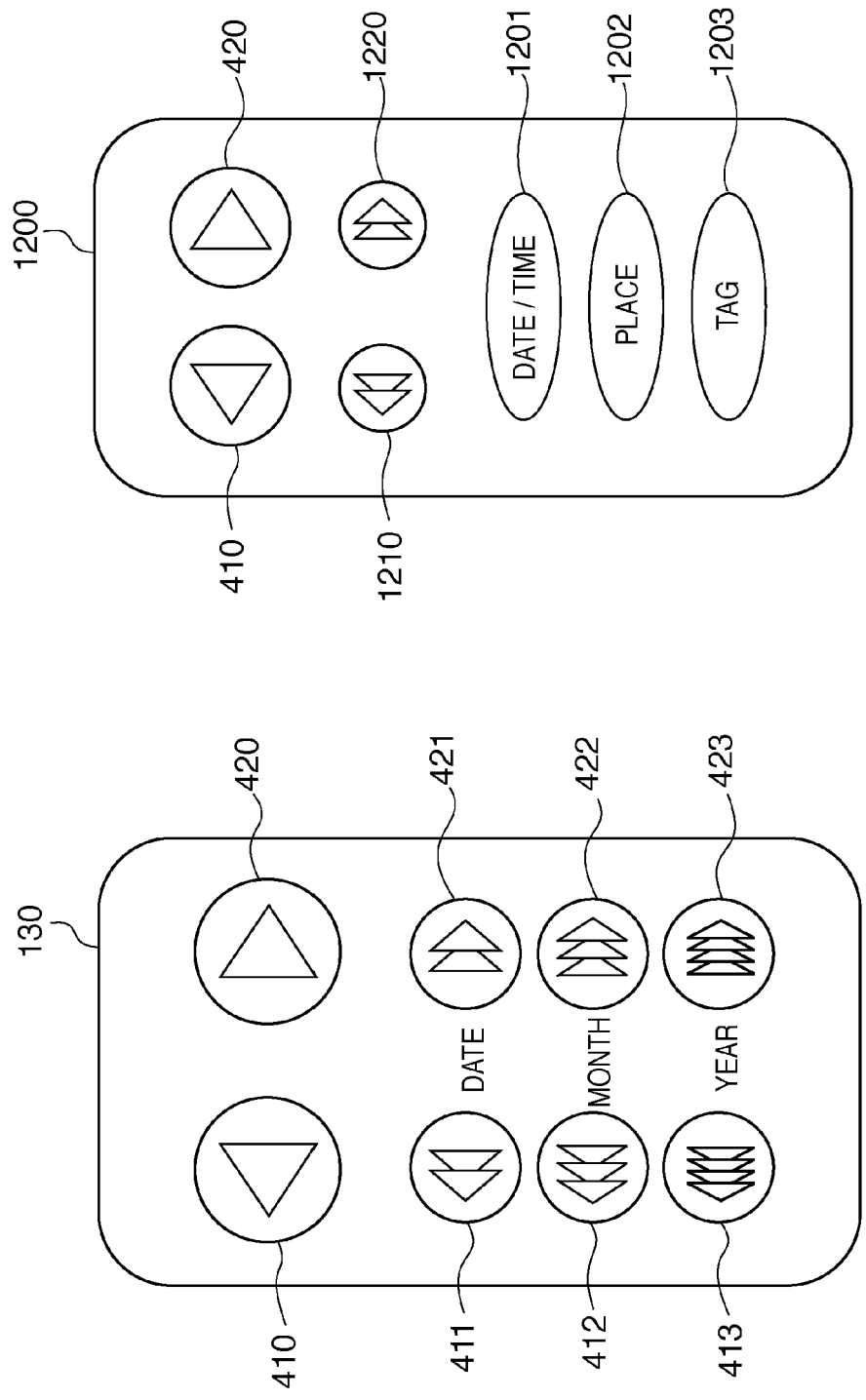

| OPERATION INPUT | READ CONDITION |
|---|---|
| NEXT | index=index+1 |
| PREV | index=index−1 |
| NEXT_DAY | date=date(day=day+1) |
| PREV_DAY | date=date(day=day−1) |
| NEXT_MONTH | date=date(month=month+1, day=1) |
| PREV_MONTH | date=date(month=month−1, day=1) |
| NEXT_YEAR | date=date(year=year+1, month=1, day=1) |
| PREV_YEAR | date=date(year=year−1, month=1, day=1) |

| STATUS ID | OPERATION INPUT | NEXT STATUS ID | READ CONDITION |
|---|---|---|---|
| ALL | NEXT | CURRENT | index=index+1 |
| ALL | PREV | CURRENT | index=index−1 |
| ALL | DATE | DATE | sort="+date", date=date(current) |
| ALL | PLACE | PLACE | sort="+place, +date"place=place(current) |
| ALL | TAG | TAG | sort="+tag, +date", tag=tag(current) |
| DATE | SKIP_NEXT | CURRENT | date=date(day=day+1) |
| DATE | SKIP_PREV | CURRENT | date=date(day=day−1) |
| PLACE | SKIP_NEXT | CURRENT | place=place(next) |
| PLACE | SKIP_PREV | CURRENT | place=place(prev) |
| TAG | SKIP_NEXT | CURRENT | tag=tag(next) |
| TAG | SKIP_PREV | CURRENT | tag=tag(prev) |

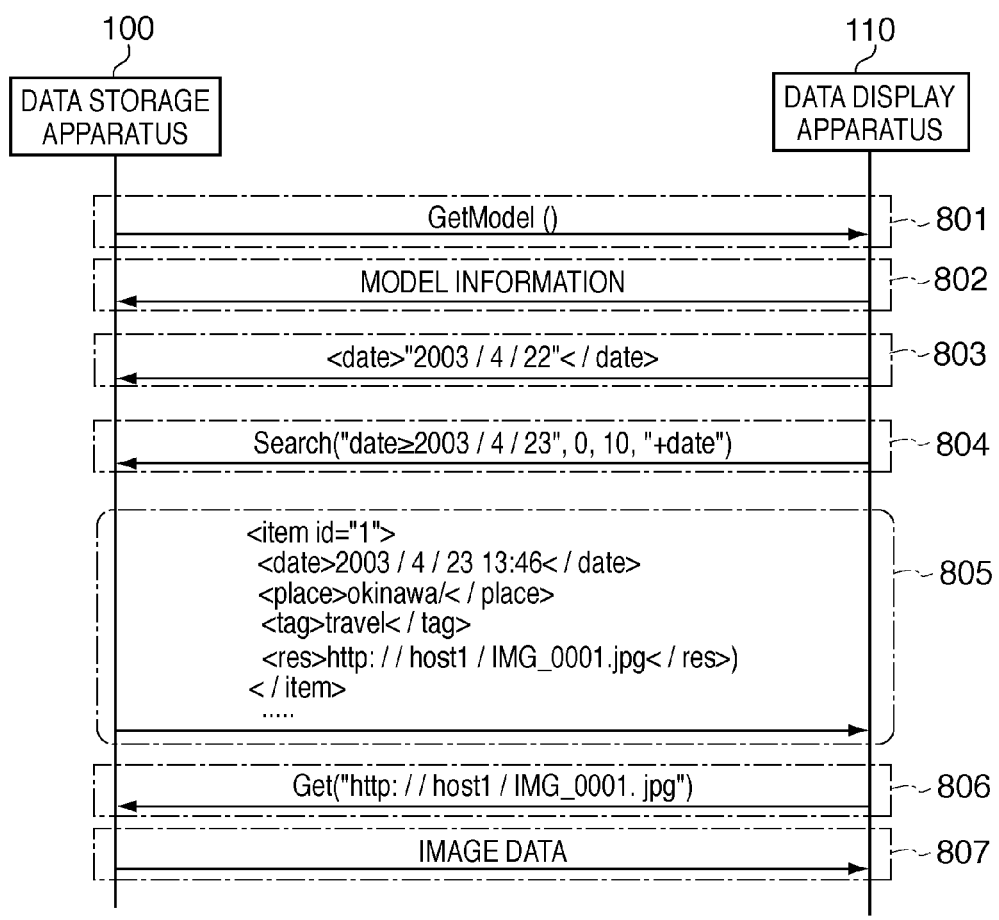

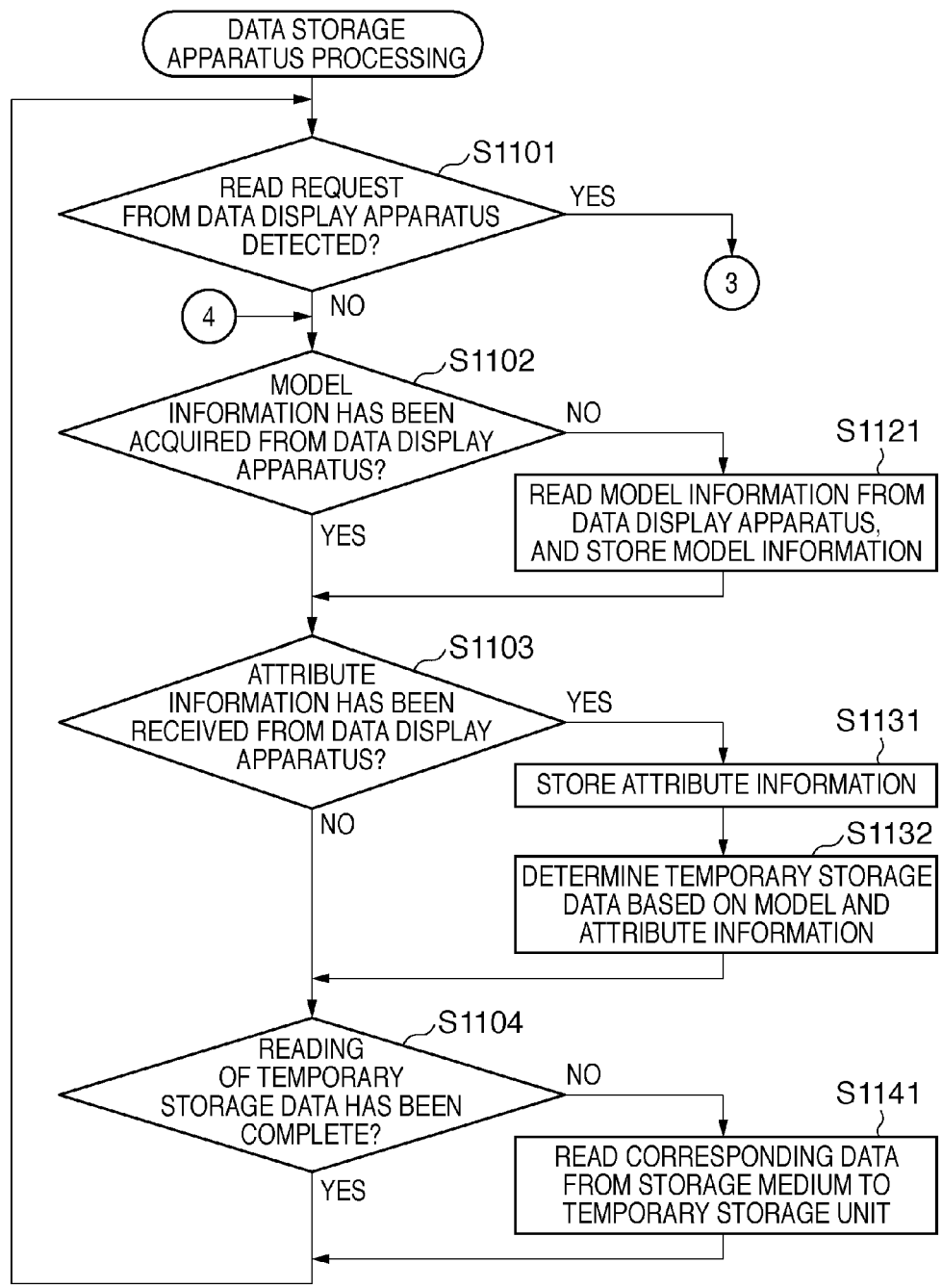

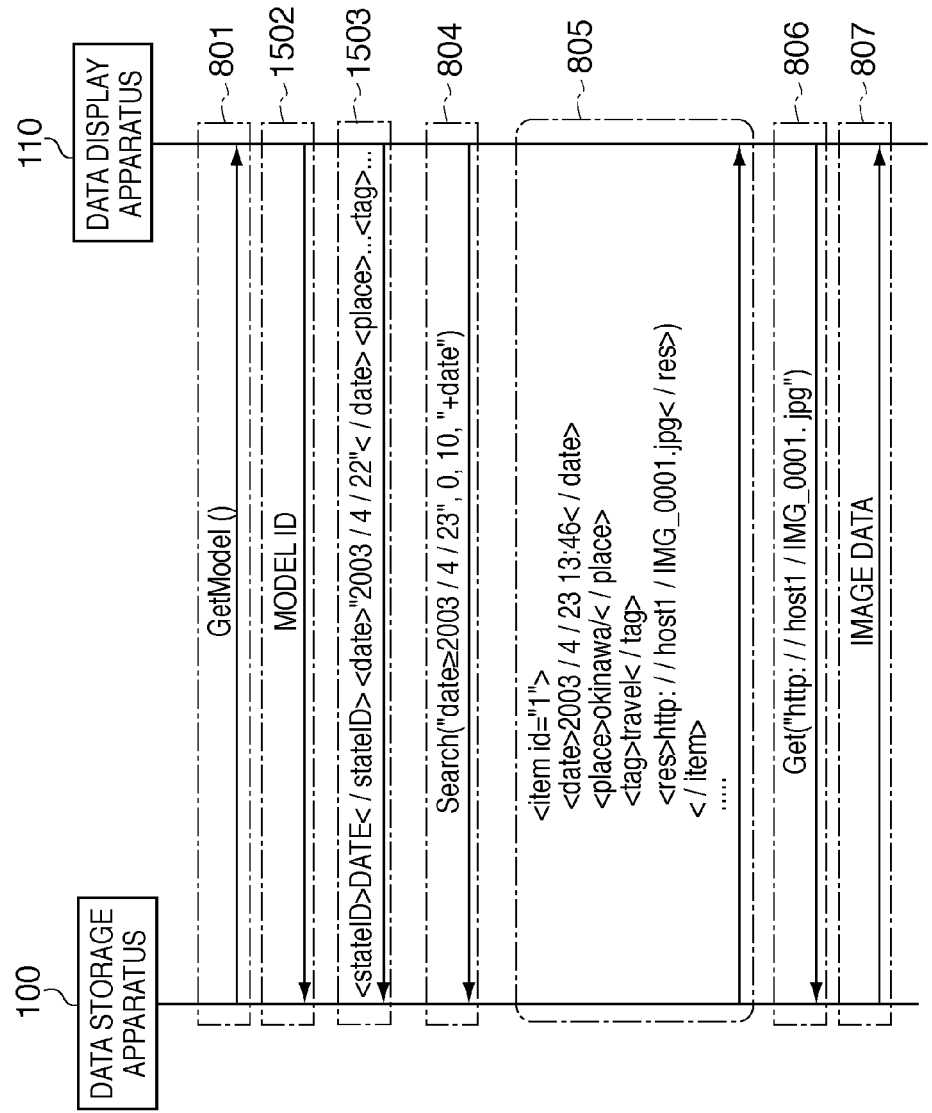

DATE STATUS

PLACE STATUS

F I G. 14A
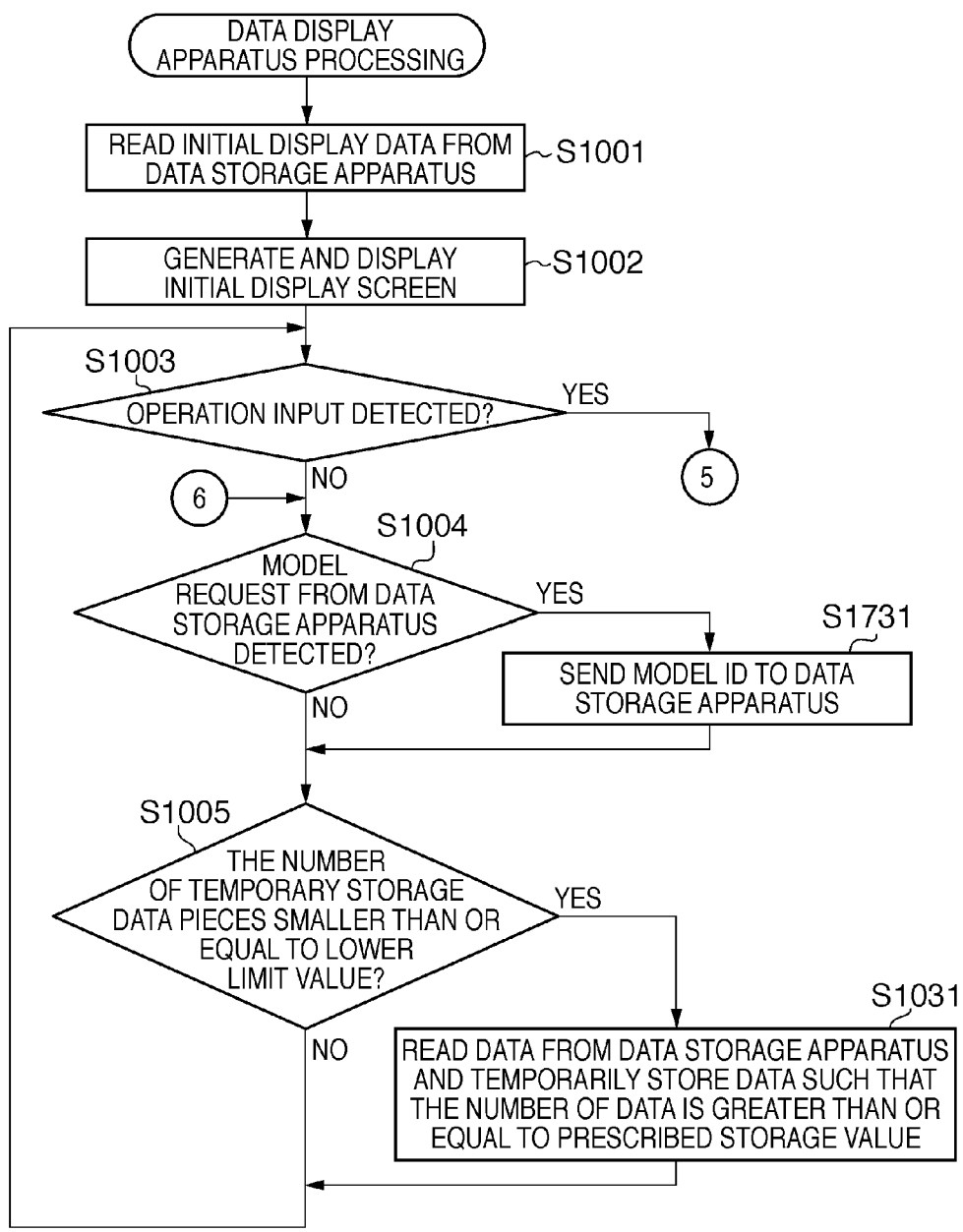

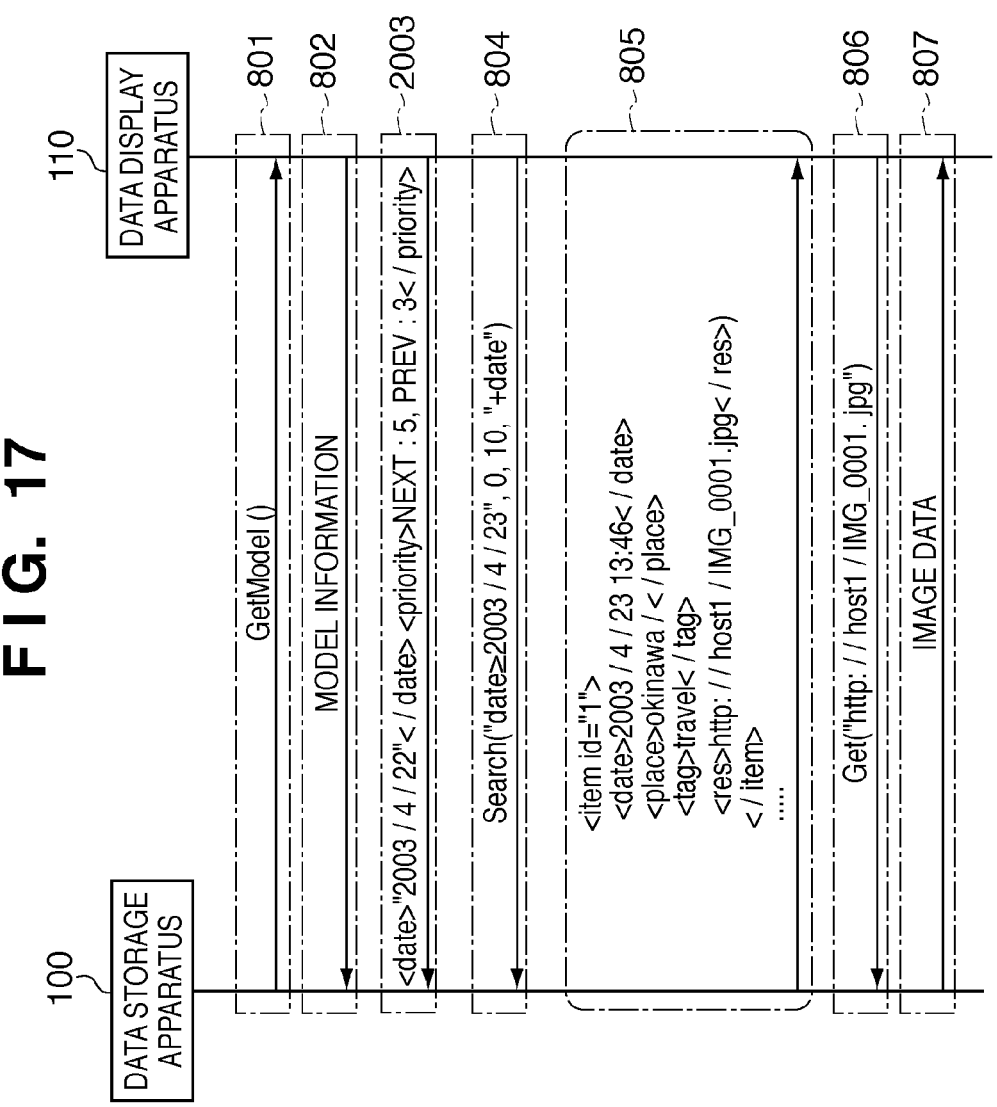

WHEN PRIORITY IS NOT GIVEN

WHEN PRIORITY IS "NEXT:5, PREV:3"

INFORMATION PROCESSING APPARATUS, DATA ACCESS SYSTEM, AND CONTROL METHOD FOR THE SAME

BACKGROUND OF THE INVENTION

1. Field of the Invention

The present invention relates to a data storage apparatus that reads and outputs data stored in a storage medium in response to a data access request from an external device. Further, the present invention relates to a data access apparatus that acquires data from an external device that stores data.

2. Description of the Related Art

In recent years, information processing apparatus such as personal computers and personal digital assistants, and digital home appliances such as digital cameras, digital video cameras, digital videodisk recorders, and digital televisions have become rapidly widespread. Furthermore, data storage media such as hard disk drives and memory cards have been increasing in capacity, as well. Generally, various contents, such as still images, video, audio, graphics, documents, presentations, spreadsheets, are distributed to and recorded in these devices. In view of this, there is a greater demand to access such contents from a certain device data stored in other devices, such as browsing contents stored in other devices via a single-function device such as a digital television, for example. Accordingly, the DLNA (Digital Living Network Alliance), for instance, has proposed rules for providing devices with a network function realized by a wireless LAN, for instance, and exchanging data between devices.

If the amount of data stored in each device becomes too large, it is difficult to read data of all the contents stored in each device at one time, and thus it is necessary to read only the necessary content data by designating conditions using functions such as retrieval and browsing. These retrieval and browsing functions are realized via a network, which increases processing time, and for example, when contents of a digital camera or a digital video camera are browsed via a digital television, a problem may occur in that responsiveness with respect to a user operation falls remarkably. In view of this, the following are known techniques to increase speed in data access via networks.

(1) In WWW browsers with which a web page is downloaded from a server and displayed, a link table is created that holds a link destination list for each web page with the selection frequency based on the past history, and pages with higher selection frequency are pre-read based on the link table (see Japanese Patent Laid-Open No. 11-024982).

(2) The mechanism of totaling and analyzing a WWW data access history is provided on a proxy server, priority is given, based on the analysis result, to the data cached by a cache server, and for each requested data piece, a condition is provided for determining whether or not to pre-read the data in accordance with the priority (see Japanese Patent Laid-Open No. 11-149405).

(3) A cache server records file accesses, and determines files to be pre-read based on files whose access frequency is high and intervals of updating the files, and pre-reads those files (see Japanese Patent Laid-Open No. 11-024981).

(4) A cache server holds user profile information, predicts a document that will be requested next and a document similar to that document using similarity between documents, and pre-reads the documents (see Japanese Patent Laid-Open No. 2001-101061).

(5) A server creates a user action model by collecting and analyzing operation history information at information reference terminals and statistical information at installation bases, and distributes the model to the information reference terminals, and the information reference terminals perform cache in advance (see Japanese Patent Laid-Open No. 2003-030037).

(6) A content browsing device analyzes at least one of metadata pieces of contents displayed in list and acquisition conditions therefor, associates them with operation screen data, generates one or more acquisition conditions for acquiring the next content list, and performs pre-reading (see Japanese Patent Laid-Open No. 2007-140985).

However, with the above conventional techniques, pre-reading using link information as disclosed in (1) cannot be applied to data access to data that does not have link information, that is, to data access by designating a condition such as the order of file creation date/time. Further, to perform pre-reading using user profile information as disclosed in (4), it is necessary to construct user profile information. Further, although pre-reading using statistical information as disclosed in (2), (3), and (5) is effective in the case where the same data is repeatedly accessed, it is not effective in the case where new data is accessed or data is accessed by designating various conditions. Furthermore, although pre-reading in association with operation screen data as disclosed in (6) is effective in the processing performed by a data access apparatus, such pre-reading cannot be applied to processing performed by a data storage apparatus.

SUMMARY OF THE INVENTION

According to one embodiment of the present invention, an information processing apparatus and a data access system that improve the speed of response to data access based on condition designation, and a control method for the same are provided.

According to one aspect of the present invention, there is provided an information processing apparatus that outputs data in response to a data access request from an external device, the information processing apparatus comprising: a first acquisition unit configured to acquire, from the external device, rule information that the external device uses when performing data access and that defines a relation between a type of operation input performed by a user and a data read condition; a second acquisition unit configured to acquire status information that includes attribute information of data that is displayed as a focus content on the external device, and indicates a current display status of the external device; a temporary memory control unit configured to determine, based on the rule information and the status information, data to be pre-read from a storage medium and stored in a temporary data storage unit, read the determined data from the storage medium, and store the read data in the temporary data storage unit; and an output unit configured, in a case where a data access request is received from the external device, if the requested data is stored in the temporary data storage unit, to read the requested data from the temporary data storage unit, and output the read data to the external device, and if the requested data is not stored, to read the requested data from the storage medium, and output the read data to the external device.

Further features of the present invention will become apparent from the following description of exemplary embodiments with reference to the attached drawings.

BRIEF DESCRIPTION OF THE DRAWINGS

FIG. 2 is a block diagram showing an example of a hardware configuration of the data access system according to the embodiment.

FIGS. 4A and 4B are diagrams showing external appearances of remote controllers of the data access system according to the embodiment.

FIGS. 7A and 7B are diagrams showing examples of model information of the data access system according to the embodiment.

FIG. 8 is a diagram showing an example of an operation sequence in the data access system according to the embodiment.

FIGS. 11A and 11B are flowcharts showing processing performed by the data storage apparatus according to the embodiment.

FIG. 12 is a diagram showing an example of an operation sequence in the data access system according to the embodiment.

FIGS. 14A and 14B are flowcharts showing processing performed by the data display apparatus according to the embodiment.

FIG. 17 is a diagram showing an example of an operation sequence in the data access system according to the embodiment.

DESCRIPTION OF THE EMBODIMENTS

Hereinafter, preferred embodiments of the present invention are described in detail with reference to the attached drawings.

First Embodiment

Figure 1:
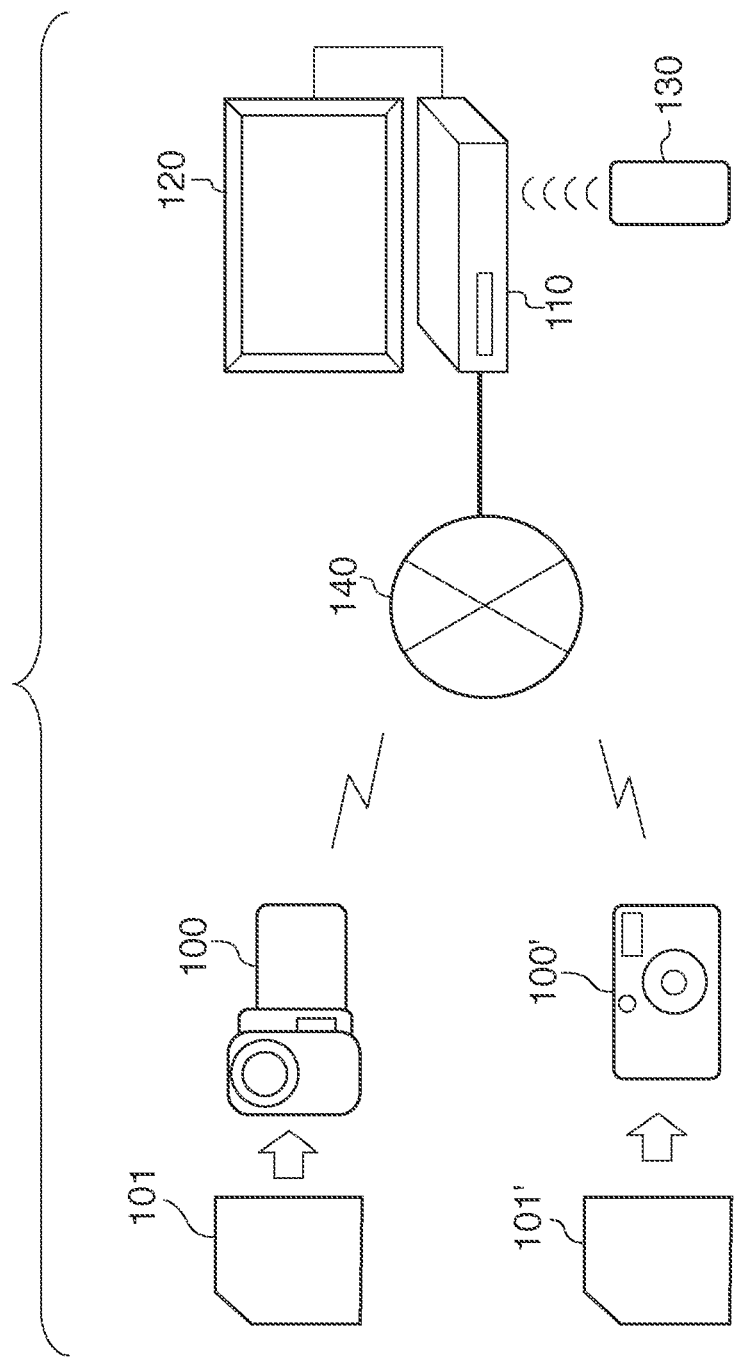
FIG. 1 is a diagram showing an example of a system configuration of a data access system according to an embodiment.

FIG. 1 is a diagram showing a system configuration of a data access system according to a first embodiment.

In FIG. 1, reference numeral 100 (100') denotes a data storage apparatus, which is an information processing apparatus that outputs data stored in a storage medium 101 (101') via a network in response to a data access request from a data display apparatus 110 serving as an external device. Specifically, the data storage apparatus 100 is an apparatus that has a server function, such as a digital video camera, a digital camera, a digital photo viewer, a digital video recorder, or a NAS (Network Attached Storage). Further, reference numeral 101 denotes a storage medium realized by a memory card, a hard disk drive, an SSD (Solid State Disk), an optical disc, or the like.

Reference numeral 110 denotes a data display apparatus serving as a data access apparatus, and the data display apparatus acquires via the network data stored in the data storage apparatus 100 serving as an external device, and displays and outputs the acquired data. Specifically, the data display apparatus 110 is an apparatus that has a client function, such as an STB (Set Top Box), or a digital video recorder. Reference numeral 120 denotes a display, which is an information processing apparatus that displays the display output from the data display apparatus 110 on a screen. Specifically, the display 120 is a liquid crystal display, a plasma display, a CRT (Cathode Ray Tube) display, or the like. Reference numeral 130 denotes a remote controller, which is a device for operating the data display apparatus 110. Specifically, the remote controller 130 is an infrared remote controller, a wireless remote controller, or the like. Reference numeral 140 denotes a network, which is specifically an IEEE802.3 wired LAN (local area network), an IEEE802.11 wireless LAN, or the like.

Note that the system configuration described above is an illustration of an example, and there is no limitation to this. For example, it is sufficient if the data storage apparatus 100 is a device that has a function of reading data from a storage medium and outputting the data to the network, and the data storage apparatus 100 may be a PC (personal computer), a mobile phone, a personal digital assistant, or the like, for example. Further, it is sufficient if the data display apparatus 110 is a device that has a function of displaying data read via the network, and a function of performing display output of data read via the network, and the data display apparatus 110 may be provided in a digital camera, a digital video camera, a digital photo viewer, or a display, for example. The data storage apparatus 100 and the data display apparatus 110 may be provided in one device, and the device may be used as a data storage display apparatus. Further, the data display apparatus 110 may be operated using a button provided to the data display apparatus 110, a touch screen provided to the display 120, or the like, instead of using the remote controller 130.

Note that in the following, unless otherwise stated, the same numerals are given to elements described with reference to other diagrams, and a description thereof is omitted.

FIG. 2 is a block diagram showing an example of a hardware configuration of the data storage apparatus 100 and the data display apparatus 110 in the data access system according to the first embodiment. In FIG. 2, reference numerals 201 and 211 denote CPUs (central processing units), reference numerals 202 and 212 denote ROMs (read-only memories), and 203 and 213 denote RAMs (random-access memories).

Reference numeral 204 denotes a storage medium interface that performs conversion between signals for causing the storage medium 101 to operate and information that can be processed by the CPU 201. Specifically, for example, the storage medium interface 204 is constituted by a SATA (Serial Advanced Technology Attachment) digital processing circuit, or the like. Reference numerals 205 and 215 denote network interfaces that perform conversion between signals for communication via the network 140 and information that can be processed by the CPUs 201 and 211. Specifically, the network interfaces 205 and 215 are constituted, for example, by signal processing circuits connected via a wireless LAN or a wired LAN, for instance.

Reference numeral 214 denotes a display interface that performs conversion between signals according to which the display 120 can perform display and information that can be processed by the CPU 211. Specifically, the display interface 214 is constituted by an LCD (liquid crystal display) controller circuit, or the like, for example. Reference numeral 216 denotes a remote controller interface that converts signals from the remote controller 130 into information that can be processed by the CPU 211. Specifically, the remote controller interface 216 is constituted by an infrared receiving circuit, or the like, for example.

In the present embodiment, processing programs including processing described below are stored in the ROMs 202 and 212, temporarily stored in the RAMs 203 and 213 as necessary, and executed by the CPUs 201 and 211. Note that the processing programs may be stored on the server or other storage media on the network. Further, the processing programs may run in conjunction with an OS (operating system).

Figure 3A:
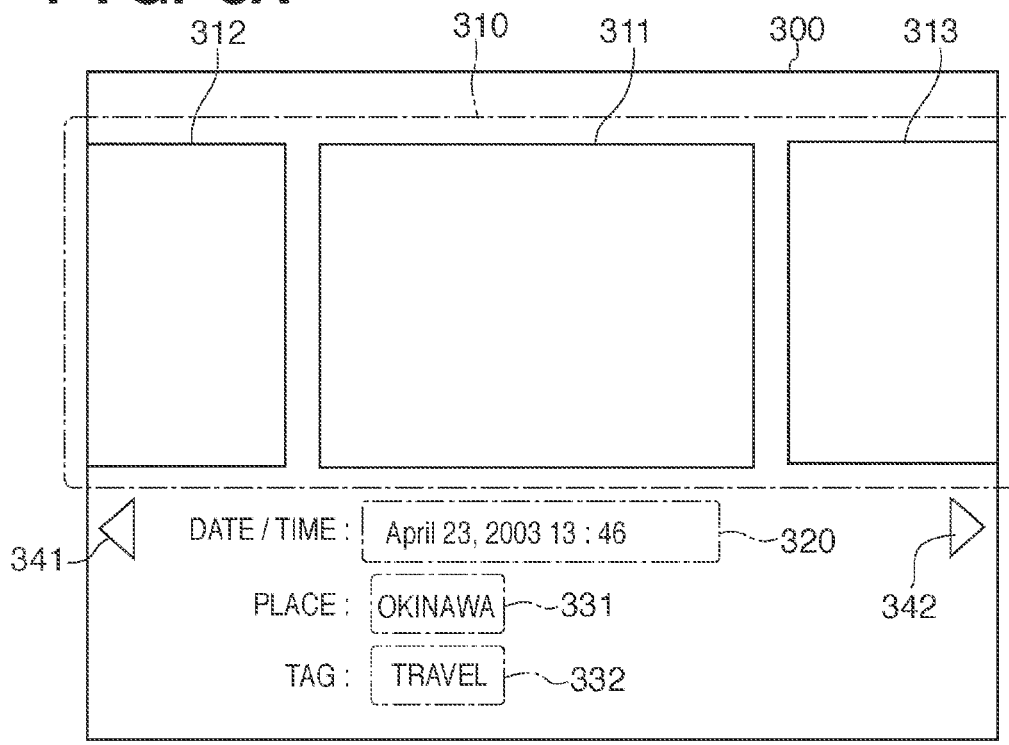
FIGS. 3A and 3B are diagrams showing examples of display screens of the data access system according to the embodiment.

FIG. 3A is a diagram showing an example of a display screen in the data access system according to the first embodiment. In FIG. 3A, reference numeral 300 denotes a display screen. The display screen 300 is constituted by an image data display area 310, content attribute information display areas (320, 331, 332), and operation indicators 341 and 342. In the image data display area 310, image data pieces are displayed in 311, 312, and 313, and the display is scrolled to the right and left according to an operation. Further, the central image data 311 is image data of a content that is a selection target, which is referred to as a focus content in the present embodiment.

The content attribute information display area 320 shows shooting date/time information of the focus content, the display area 331 shows shooting place information, and the display area 332 shows tag information set by a user. The operation indicators 341 and 342 indicate that it is possible to perform scrolling to the right or left in the shooting date/time order by performing a right or left button operation. Note that FIG. 3A shows an example of the display screen 300, and an arrangement, types of attribute information that is displayed, image data that is displayed, the number of attribute information pieces, and so on are not limited to those shown in the example.

FIG. 4A is a diagram showing the external appearance of the remote controller 130 in the data access system according to the first embodiment. As shown in FIG. 4A, the remote controller 130 has:
  right and left scroll buttons for giving an instruction to scroll to the right or left (a right scroll button 410, and a left scroll button 420);
  day-unit skip buttons for giving an instruction to skip in a day unit (a previous day skip button 411, and a next day skip button 421);
  month-unit skip buttons for giving an instruction to skip in a month unit (a previous month skip button 412, and a next month skip button 422); and
  year-unit skip buttons for giving an instruction to skip in a year unit (a previous year skip button 413, and a next year skip button 423).

The right and left scroll buttons give an instruction to change a focus content on the display screen 300 to a previous content or a following content in the order one by one. The right scroll button 410 gives an instruction to set a previous content as the focus content (right scrolling), and the left scroll button 420 gives an instruction to set a following content as the focus content (left scrolling).

The date-unit skip buttons give an instruction to change the focus content to a content captured on the day previous to or the day following the shooting date/time of the current focus content, as the next focus content. The previous day skip button 411 gives an instruction to set the content captured on the previous day, and the next day skip button 421 gives an instruction to set the content captured on the following day, as the next focus content.

The month-unit skip buttons give an instruction to change the focus content to a content captured in the month previous to or the month following the shooting date/time of the current focus content, as the next focus content. The previous month skip button 412 gives an instruction to set the content captured in the previous month, and the next month skip button 422 gives an instruction to set the content captured in the following month, as the next focus content.

The year-unit skip buttons give an instruction to change the focus content to a content captured in the year previous to or the year following the shooting date/time of the current focus content, as the next focus content. The previous year skip button 413 gives an instruction to set the content captured in the previous year, and the next year skip button 423 gives an instruction to set the content captured in the following year, as the next focus content.

Note that FIG. 4A shows an example of the remote controller 130, and the arrangement of buttons, the operation content, and so on are not limited to those shown in the example. Further, a dial, an acceleration sensor, or a touchpad may be used instead of buttons.

Figure 5:
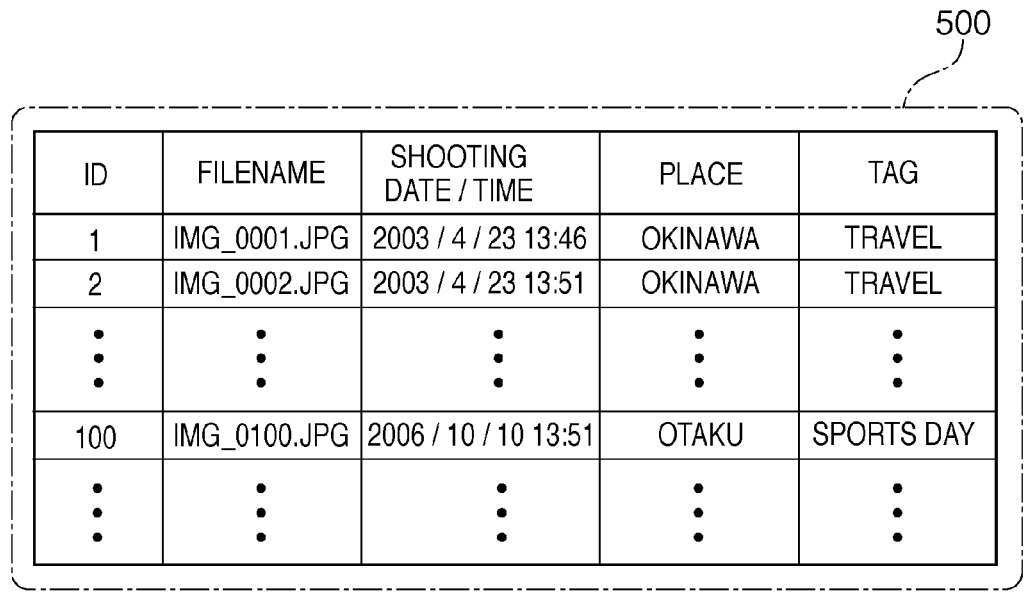
FIG. 5 is a diagram showing an example of content attribute information of the data access system according to the embodiment.

FIG. 5 is a diagram showing an example of content attribute information in the data access system according to the first embodiment. Attribute information 500 of contents is stored in the storage medium 101 together with content data, and is configured having ID information, filename information, shooting date/time information, place information, and tag information. Here, ID information is information for uniquely identifying a content. Further, filename information is information for reading data from the storage medium 101. Further, shooting date/time information indicates the date/time when the content was captured, place information indicates the place where the content was captured using GPS (Global Positioning System) information or the like, and tag information indicates the classification given by the user. For example, with regard to the content whose ID is "2", the filename is "IMG_0002.JPG", the shooting date/time is "2003/4/23 13:51", the shooting place is "Okinawa", and the tag is "travel".

Note that the attribute information 500 is an illustration of an example, and the type of information, the information content, and so on are not limited to those shown in the example. Further, data handled by the data storage apparatus 100 and the data display apparatus 110 is not limited to still image data, and may be video data, audio data, graphic data, document data, presentation data, or spreadsheet data. Further, with regard to the above various data pieces, later-described pre-read data can be at least one of the entire data, attribute information of the data, and image data indicating the data (thumbnail or the like). Further, the attribute information 500 may be one file or a plurality of files, or may be given to the header of a content file, for instance.

Figure 6:
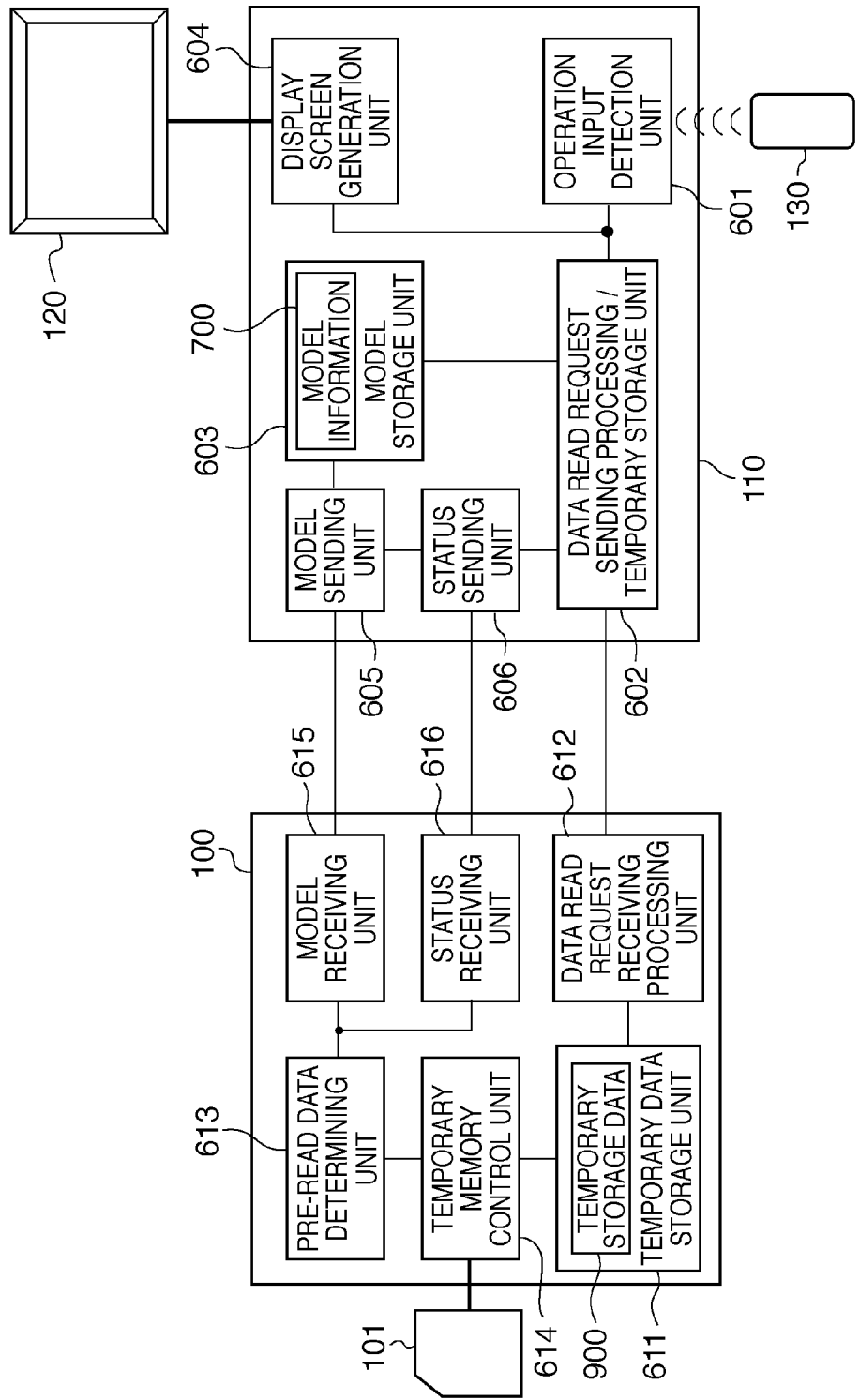
FIG. 6 is a block diagram showing an example of a function configuration of the data access system according to the embodiment.

FIG. 6 is a block diagram showing an example of a function configuration of the data access system according to the first embodiment. In FIG. 6, the data display apparatus 110 has an operation input detection unit 601, a data read request sending processing/temporary storage unit 602, a model storage unit 603, a display screen generation unit 604, a model sending unit 605, and a status sending unit 606. Further, the data storage apparatus 100 has a temporary data storage unit 611, a data read request receiving processing unit 612, a pre-read data determining unit 613, a temporary memory control unit 614, a model receiving unit 615, and a status receiving unit 616. The functions are realized by the CPUs 201 and 212 of the apparatus executing the programs stored in the ROMs 202 and 212 or the RAMs 203 and 213, in other words, by software and hardware cooperating.

The operation input detection unit 601 receives operation signals from the remote controller 130 via the remote controller interface 216, and determines which operation button shown in FIG. 4A has been pressed. The data read request sending processing/temporary storage unit 602 manages the status of a focus content, for instance, and based on the determined operation content and model information 700 (FIG. 7A), sends a data read request to the data storage apparatus 100, and receives and temporarily stores data. The display screen generation unit 604 creates the display screen 300 based on the data read by the data read request sending processing/temporary storage unit 602, and displays the created screen on the display 120. The model storage unit 603 stores the model information 700. The model sending unit 605 reads the model information 700 from the model storage unit 603, and sends the read information to the data storage apparatus 100. The status sending unit 606 acquires attribute information of a focus content from the data read request sending processing/temporary storage unit 602, and sends the acquired information to the data storage apparatus 100.

In the data storage apparatus 100, the model receiving unit 615 receives the model information 700 sent from the model sending unit 605, and notifies the pre-read data determining unit 613 of the received model information, and the status receiving unit 616 receives the attribute information sent from the status sending unit 606, and notifies the pre-read data determining unit 613 of the received attribute information. The pre-read data determining unit 613 determines data to be pre-read based on the model information 700 and the attribute information that have been received, and notifies the temporary memory control unit 614 of the determined data. The temporary memory control unit 614 reads corresponding data from the storage medium 101, and stores the read data in the temporary data storage unit 611 as temporary storage data 900 (described later with reference to FIG. 9). Here, the temporary data storage unit 611 is a storage medium such as the RAM 203 that enables reading at higher speed than the storage medium 101. Upon receiving a data read request from the data read request sending processing/temporary storage unit 602, the data read request receiving processing unit 612 reads data corresponding to the request from the temporary data storage unit 611, and sends the read data to the data display apparatus 110. Note that if there is no data corresponding to that request in the temporary data storage unit 611, the data read request receiving processing unit 612 reads corresponding data from the storage medium 101.

As shown in FIG. 6, by sending the model information 700 and the attribute information that indicates the status of the data display apparatus 110 from the data display apparatus 110 to the data storage apparatus 100, appropriate data can be stored in the temporary data storage unit 611, and thus it is possible to perform processing with respect to a data read request at high speed.

FIG. 7A is a diagram showing an example of model information in the data access system according to the first embodiment. Model information is rule information that defines the relation between the type of user operation input and a data read condition. The data display apparatus 110 uses rule information in order to determine data to be accessed when performing data access (data request) according to an operation input for access. Further, this rule information is also used in the data storage apparatus for determining which data is to be pre-read. As shown in FIG. 7A, the model information 700 is information for determining a read condition for data to be displayed next when the data display apparatus 110 is operated. The model information 700 is also used as a pre-read rule for when determining data to be pre-read in the data storage apparatus 100.

The model information 700 according to the first embodiment is configured by operation input information and read condition information. Here, operation input information corresponds to the buttons of the remote controller 130. For example, "NEXT" corresponds to the left scroll button 420, "PREV" corresponds to the right scroll button 410, "NEXT_DAY" corresponds to the next day skip button 421, and "PREV_DAY" corresponds to the previous day skip button 411. Similarly, "NEXT_MONTH" corresponds to the next month skip button 422, "PREV_MONTH" corresponds to the previous month skip button 412, "NEXT_YEAR" corresponds to the next year skip button 423, and "PREV_YEAR" corresponds to the previous year skip button 413.

Further, read condition information of the model information 700 indicates conditions for reading data, where "index" indicates an index, which is the order when contents are arranged in the shooting date/time order, "date" indicates a designation date/time, and data in parentheses indicates a condition for a designation date/time. For example, in the case of "NEXT_YEAR", and "date=date (year=year+1, month=1, day=1)", if the shooting date/time information of a focus content indicates "2003/4/23 13:51", the designation date/time "2004/1/1" is the read condition. Further, more specifically, using the initial content captured on the designation date/time "2004/1/1" as a focus content, contents before/after that content are read. Note that the model information 700 shown in FIG. 7A is an illustration of an example, and there is no limitation to this.

FIG. 8 is a diagram showing an example of an operation sequence in the data access system according to the first embodiment. In FIG. 8, reference numeral 801 denotes a model request, which is sent by the data storage apparatus 100 to the data display apparatus 110. Reference numeral 802 denotes model information sending, where the data display apparatus 110 sends model information to the data storage apparatus in response to the model request 801. By issuing the model request 801 to the data display apparatus 110, the data storage apparatus 100 acquires the model information 700 from the data display apparatus 110 (first acquisition processing). Reference numeral 803 denotes status information, for which at least a portion of attribute information of a focus content is used. In the present embodiment, status information is shooting date/time information of a focus content. The status information 803 is information sent by the data display apparatus 110 to the data storage apparatus 100 as information indicating access status (the current displaying status). In this way, the data storage apparatus 100 acquires the status information 803 from the data display apparatus 110 (second acquisition processing). Further, reference numeral 804 denotes an attribute information read request for requesting to read attribute information of a content, which is sent by the data display apparatus 110 to the data storage apparatus 100. Reference numeral 805 denotes attribute information, which is information that the data storage apparatus 100 reads in response to the read request 804, and sends to the data display apparatus 110. Reference numeral 806 denotes an image data read request to read image data of the content, and reference numeral 807 denotes image data. Note that both of the attribute information read request 804 and the image data read request 806 correspond to data read requests of the present embodiment.

The status information (803) indicates data that is currently displayed by the data display apparatus 110, and the pre-read data determining unit 613 of the data storage apparatus 100 determines data to be pre-read, taking this status information into consideration. As status information, at least a portion of attribute information of the data currently displayed can be used, and preferably, a portion of attribute information (shooting date/time information) of the data that is focused on the display is used, as described above. In the case of the present embodiment, since a pre-read rule is applied according to which a content to be pre-read can be determined based on the shooting date/time information of a focus content, it is sufficient to use only the shooting date/time information. Note that in the case of a pre-read rule shown by model information 1400 later described with reference to FIG. 7B, since place information and tag information are also necessary in order to determine a content to be pre-read, it is necessary to acquire at least such information pieces. Further, depending on a pre-read rule, there are cases where it is necessary to uniquely specify a content, and in such cases, attribute information will be used according to which a content can be uniquely specified using an ID or a filename (URL).

The attribute information read request 804 is configured by request identification information "Search", and data acquisition condition information in parentheses, and the first condition of the data acquisition conditions indicates a search condition, the second condition indicates a start index, the third condition indicates the number of contents to be read, and the fourth condition indicates a sort condition. For example, in the case of ("date≥2003/4/23", 0, 10, "+date"), the data acquisition conditions indicate that ten contents captured on and after Apr. 23, 2003 are read from the zeroth content in the shooting date/time order. In the case where the last content captured on Apr. 22, 2003 has been read, and the user desires to read the content that follows that last content next in ascending order, the data acquisition conditions ("date≥2003/4/23", 0, 10, "+date") are set via a user interface. Further, the image data read request 806 is configured by request identification information "Get" and a data acquisition condition in parentheses, and a URL (uniform resource locator) is designated as a data acquisition condition. Further, the status information 803 and the attribute information 805 of a content to be read are written in XML (Extensible Markup Language) format.

Note that this sequence is an illustration of an example, and the information procedure, the information content, and so on are not limited to those shown in the example. For example, the status information 803 may be inserted in the search condition of the attribute information read request 804, and sent together with the request, and the data storage apparatus may extract the status information.

Figure 9:
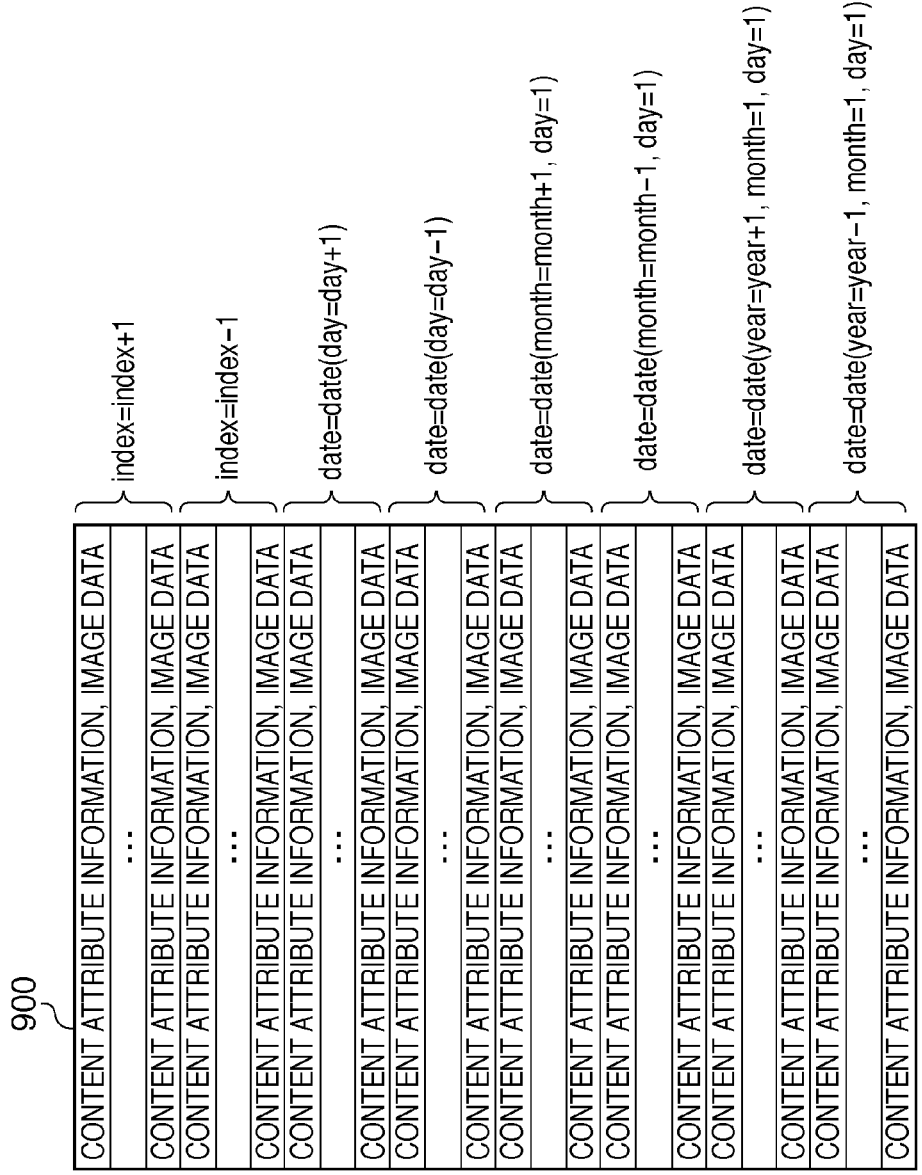
FIG. 9 is a diagram showing an example of temporary storage data in a data storage apparatus according to the embodiment.

FIG. 9 is a diagram showing an example of the temporary storage data 900 in the data storage apparatus 100 according to the first embodiment. In FIG. 9, the temporary storage data 900 is configured by content attribute information and image data under a predetermined condition. Here, "image data" is content data or data obtained by reducing content data if content data is image data, and "image data" is alternate image data or the like if content data is not image data, and further "image data" may be dynamically generated, or may be generated in advance and stored in the storage medium. In the example shown in FIG. 9, based on the model information 700, data that meets a condition, such as "index=index+1", "index=index−1", "date=date (day=day+1)", or "date=date (day=day−1)", is temporarily stored. A description is given with regard to the case where the shooting date/time obtained as status information is "2003/4/23", the start index of the data read condition is 0, and the number of contents to be read is 10, for example. In this case, it is determined that "index" is nine, and for "index=index+1", a predetermined number of contents are read from the tenth content captured on 2003/4/23 in ascending order, for "index=index−1", a predetermined number of contents are read from the eighth content in descending order, for "date=date (day=day+1)", a predetermined number of contents are read in ascending/descending order from the initial content captured on the shooting day following 2003/4/23, which is, for example, 2003/4/26, and for "date=date (day=day−1)", a predetermined number of contents are read in ascending/descending order from the initial content captured on the shooting day previous to 2003/4/23, which is, for example, 2003/4/18.

Contents are read in a similar way under other conditions. Note that the temporary storage data 900 is an illustration of an example, and there is no limitation to this.

Figure 10A:
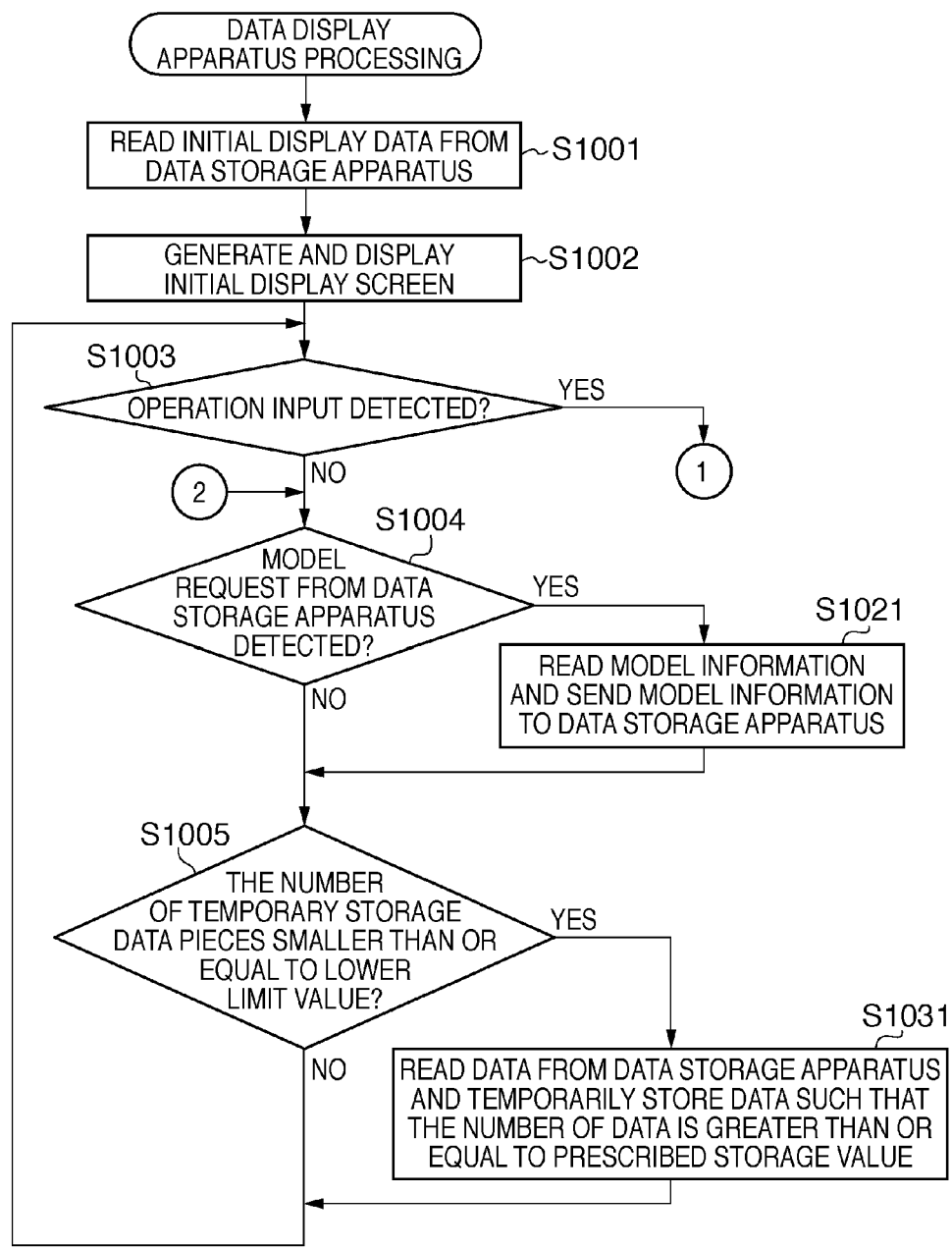
FIGS. 10A and 10B are flowcharts showing processing performed by a data display apparatus according to the embodiment.
Figure 10B:
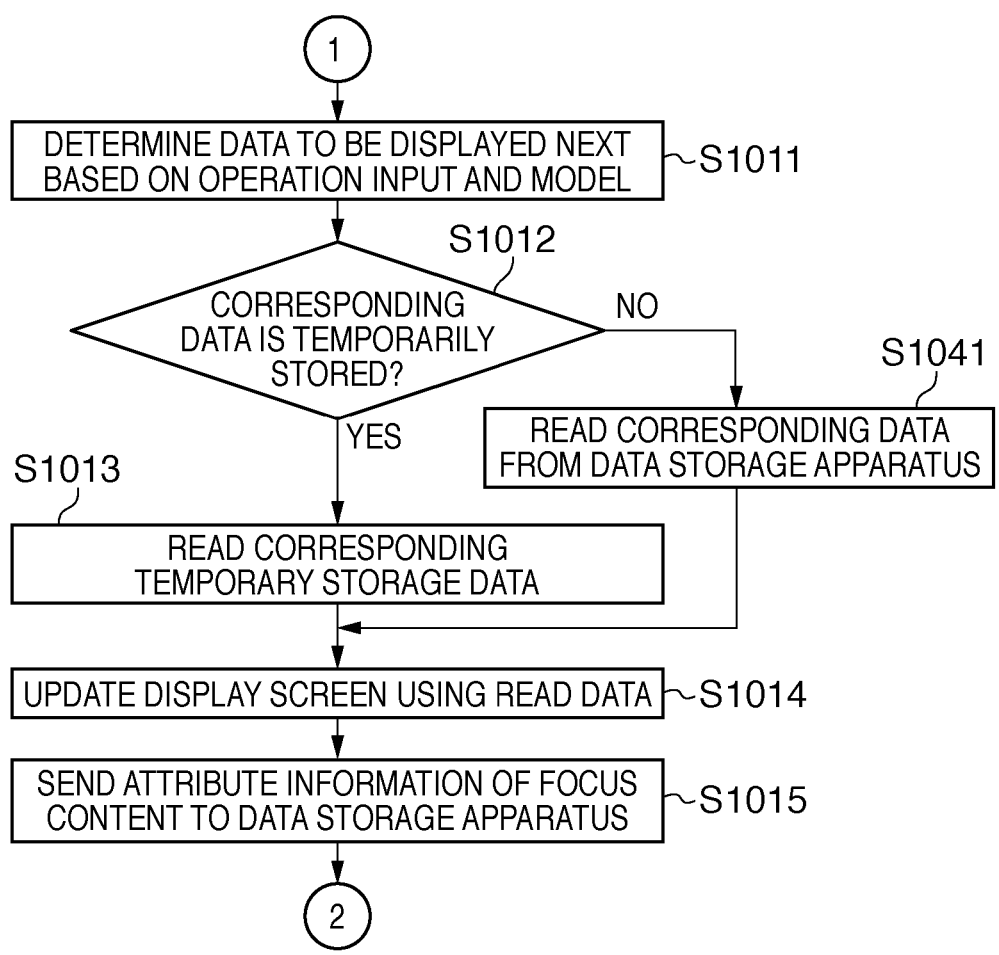

FIGS. 10A and 10B are flowcharts showing processing performed by the data display apparatus 110 according to the first embodiment. It is assumed that data display apparatus processing starts immediately after the power to the data display apparatus is turned on, and continues until the power is turned off.

As shown in FIGS. 10A and 10B, when processing performed by the data display apparatus 110 starts, the data read request sending processing/temporary storage unit 602 reads initial display data from the data storage apparatus 100 (S1001). Then, the display screen generation unit 604 generates a screen using the initial display data, and displays it on the display 120 (S1002). Subsequently, detection of an operation input is performed (S1003), detection of a model request from the data storage apparatus 100 is performed (S1004), and it is determined whether the number of temporary storage data pieces is smaller than or equal to a prescribed lower limit value (S1005). Note that processing in S1003 is performed by the operation input detection unit 601, processing in S1004 is performed by the model sending unit 605, and processing in S1005 is performed by the data read request sending processing/temporary storage unit 602.

If an operation input is detected in S1003 (Yes in S1003), the data read request sending processing/temporary storage unit 602 determines data to be displayed next based on the operation input and the model information 700 (S1011). Next, if data corresponding to the next display data is temporarily stored (Yes in S1012), the data read request sending processing/temporary storage unit 602 reads corresponding temporary storage data (S1013). On the other hand, if corresponding data is not temporarily stored (No in S1012), the data read request sending processing/temporary storage unit 602 reads corresponding data from the data storage apparatus 100 (S1041). More specifically, a series of processing shown by 804 to 807 in FIG. 8 is executed. Specifically, if the data read request sending processing/temporary storage unit 602 sends an attribute information read request to the data storage apparatus 100 (804 in FIG. 8), a URL is sent from the data storage apparatus 100 (805). The data read request sending processing/temporary storage unit 602 sends a data read request to the data storage apparatus 100 using the URL (806), and acquires corresponding image data from the data storage apparatus 100 (807). Subsequent to S1013 or S1041, the display screen generation unit 604 updates a display screen using the read data (S1014). Furthermore, the status sending unit 606 sends attribute information of a focus content on the display screen that has been updated to the data storage apparatus 100 as the status information 803 (S1015), and thereafter the processing returns to S1004.

In S1004, if the model request 801 from the data storage apparatus 100 is detected (Yes in S1004), the model information 700 is read from the model storage unit 603, and is sent to the data storage apparatus 100 (S1021, the model information sending 802). In the present embodiment, as a method for notifying the data storage apparatus 100 of the model information to be used from the data display apparatus 110, although the model information itself is sent, there is no limitation to this. As described in a second embodiment, a configuration can also be adopted in which identification information for specifying model information is sent. After S1021, the processing returns to S1005. In S1005, the data read request sending processing/temporary storage unit 602 determines whether or not the number of temporary storage data pieces is smaller than or equal to the prescribed lower limit value. If it is determined that the number of temporary storage data pieces is smaller than or equal to the prescribed lower limit value (Yes in S1005), the data read request sending processing/temporary storage unit 602 reads data from the data storage apparatus 100, and temporarily stores the read data, such that the number of temporary storage data pieces is greater than or equal to a prescribed storage value (S1031). Data reading processing in S1031 is similar to processing in S1041 described above. After that, the processing returns to S1003.

Figure 11B:
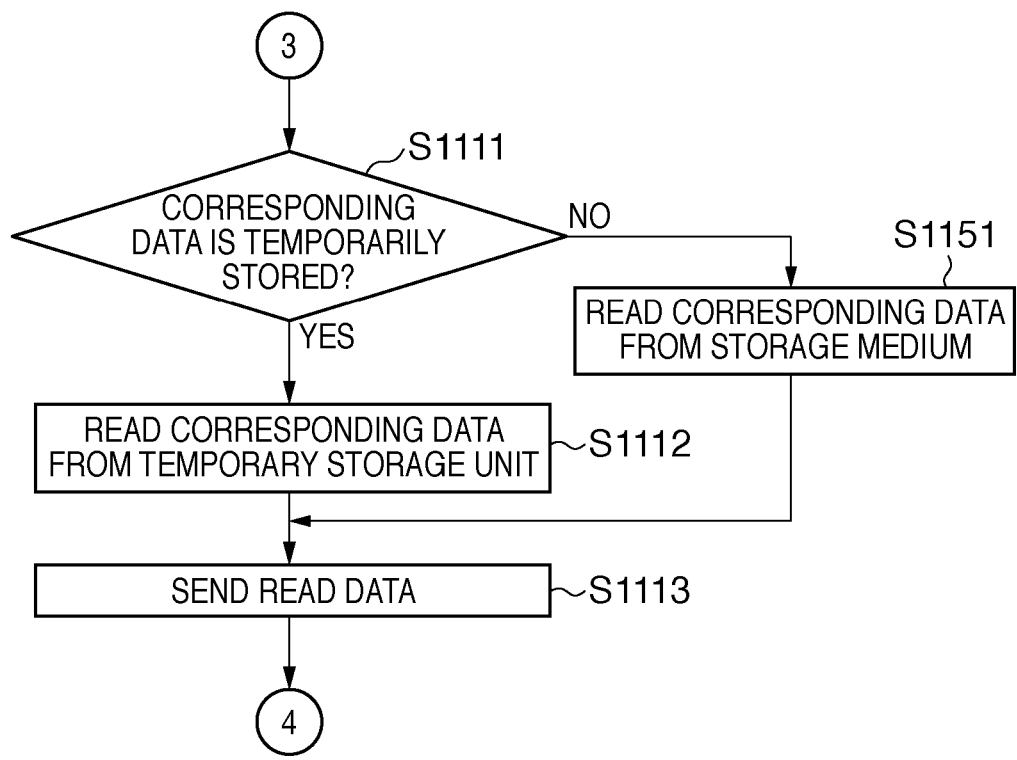

FIGS. 11A and 11B are flowcharts showing processing performed by the data storage apparatus 100 according to the first embodiment. It is assumed that the present processing performed by the data storage apparatus 100 starts immediately after the power to the data storage apparatus 100 is turned on, and continues until the power is turned off.

As shown in FIGS. 11A and 11B, when processing performed by the data storage apparatus 100 starts,
- the data read request receiving processing unit 612 performs detection of a data read request (the attribute information read request 804, the image data read request 806) from the data display apparatus 110 (S1101),
- the model receiving unit 615 determines whether or not the model information 700 has been acquired from the data display apparatus 110 (S1102),
- the status receiving unit 616 performs detection of receiving the status information 803 (attribute information of a focus content in this example) from the data storage apparatus 100 (S1103), and
- the temporary memory control unit 614 performs confirmation of completion of reading temporary storage data (S1104).

If a data read request is detected in S1101 (Yes in S1101), the data read request receiving processing unit 612 determines whether or not corresponding data is stored in the temporary data storage unit 611 (S1111). If it is determined in S1111 that corresponding data is temporarily stored (Yes in S1111), the data read request receiving processing unit 612 reads corresponding data from the temporary data storage unit 611. On the other hand, if it is determined that corresponding data is not temporarily stored (No in S1111), the data read request receiving processing unit 612 reads corresponding data from the storage medium 101 (S1151). Subsequent to S1112 or S1151, the data read request receiving processing unit 612 sends the read data to the data display apparatus 110 (S1113), and the processing returns to S1102.

If it is determined in S1102 that the model information 700 has not been acquired (No in S1102), the model receiving unit 615 acquires the model information 700 from the data display apparatus 110 (the model request 801, the model information sending 802), and stores the acquired information (S1121). Specifically, in the first embodiment, the data storage apparatus 100 receives rule information that is used by the data display apparatus 110 from the data display apparatus 110 (802). However, if the data storage apparatus 100 already holds rule information that is used by the data display apparatus 110, the data storage apparatus 100 does not need to receive the rule information. Specifically, first acquisition processing is not necessarily processing for receiving rule information. After S1121, the processing returns to S1103.

In S1103, if it is detected that the status information 803 has been received (Yes in S1103), the status receiving unit 616 stores the received attribute information (S1131). Then, based on the model information 700 and the received attribute information, the pre-read data determining unit 613 determines data to be pre-read (data to be stored in the temporary data storage unit 611) (S1132). After that, the processing returns to S1104.

Note that in the first embodiment, a configuration may be adopted in which "place" and/or "tag" are fixed, and a content can be searched for based on "date/time". In this case, for example, if "place" is fixed to Okinawa, pre-read processing described above will be performed in the range of contents whose "place" attribute is Okinawa.

In S1104, the temporary memory control unit 614 determines whether or not reading of data determined in S1132 as being pre-read data (temporary storage data) to the temporary data storage unit 611 has been complete. If it is determined that reading of pre-read data has not been complete (No in S1104), the temporary memory control unit 614 reads corresponding data from the storage medium 101, and stores the read data in the temporary data storage unit 611 (S1141). After that, the processing returns to S1101.

According to the first embodiment, the data storage apparatus 100 acquires the model information 700 and the status information 803 of a focus content from the data display apparatus 110, and determines data to be pre-read based on these. Accordingly, it is possible to pre-read appropriate data to the high-speed readable temporary data storage unit 611. Therefore, it is possible to increase the speed of response of the data storage apparatus 100 with respect to a data read request from the data display apparatus 110. Note that although a configuration is adopted in which status information itself is acquired from the data display apparatus 110 (803), there is no limitation to this. For example, a configuration may be adopted in which data requested by the image data read request 806 from the data display apparatus 110 is considered as a focus content, and attribute information thereof is used as status information. Specifically, a configuration may be adopted in which attribute information of a focus content is specified based on the image data read request 806.

Second Embodiment

Next, a second embodiment of the present invention is described in detail with reference to the attached drawings. Note that the system configuration, the hardware configuration, content attribute information, and the function configuration are similar to those described in the first embodiment (FIGS. 1, 2, 5, 6). In the following, unless otherwise stated, the same numerals are given to elements described with reference to other diagrams, and a description thereof is omitted.

FIG. 4B shows a remote controller of a data access system according to the second embodiment. A remote controller 1200 has a right scroll button 410, a left scroll button 420, skip buttons 1210 and 1220, a date/time condition selection button 1201, a place condition selection button 1202, and a tag condition selection button 1203. The skip buttons 1210 and 1220 give an instruction to skip in accordance with the condition selected using the selection button 1201, 1202, or 1203, and skipping to a previous day content or to a following day content is performed when "date/time" is selected, skipping to a previous place content or to a following place content in the order of the Japanese syllabary is performed when "place" is selected, and similarly, skipping to a previous tag content or to a following tag content is performed when "tag" is selected. The date/time condition selection button 1201 is a button for selecting browsing of contents in the shooting date/time order, and skipping based on a shooting date/time. Similarly, the place condition selection button 1202 is a button for selecting browsing of contents in the place order, and skipping based on a place. Further, the tag condition selection button 1203 is a button for selecting browsing of contents in the tag order, and skipping based on a tag.

Note that the remote controller 1200 is an illustration of an example, and the arrangement of buttons, the operation content, and so on are not limited to those shown in the example. Further, for example, an instruction may be given to group data based on attribute information such as date, place, or tag, rather than to sort based on attribute information such as date, place, or tag.

Figure 3B:
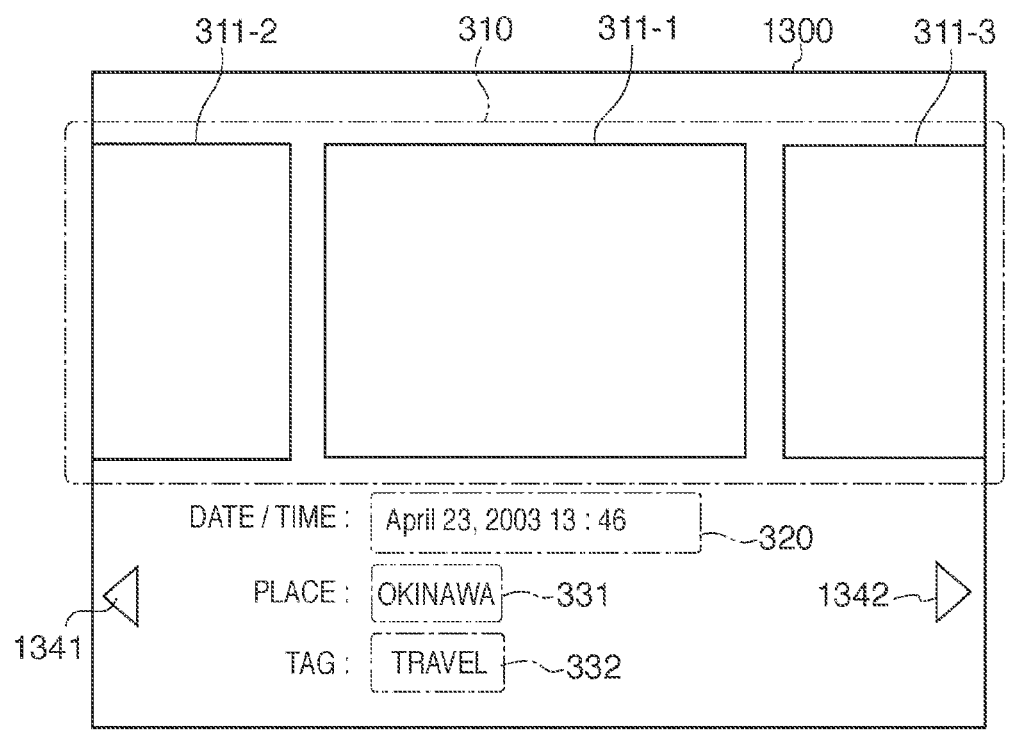

FIG. 3B is a diagram showing an example of a display screen of the data access system according to the second embodiment. In FIG. 3B, reference numerals 1341 and 1342 denote operation indicators for when a place condition is selected. The operation indicators 1341 and 1342 indicate that it is possible to skip and scroll to the right or left in the place order by performing the right scroll button 410 operation or the left scroll button 420 operation. Further, although not shown here, when "tag" is selected, operation indicators are displayed alongside of the tag information 332, and when "date" is selected, operation indicators are displayed alongside of the date information 320.

Note that a display screen 1300 is an illustration of an example, and the arrangement, the type of attribute information displayed, image data displayed, the number of attribute information pieces, and so on are not limited to those shown in the example. For example, rather than sorting based on attribute information such as date, place, or tag, grouping may be performed based thereon, and an image representative thereof may be displayed.

FIG. 7B is a diagram showing an example of model information in the data access system according to the second embodiment. In FIG. 7B, model information 1400 is information for determining a read condition of data to be displayed next when the data display apparatus 110 is operated, and is also used as a pre-read rule for when determining data to be pre-read in the data storage apparatus 100. The model information 1400 has status ID information, operation input information, next status ID information, and read condition information.

Here, status ID information means a sort condition that is selected, "DATE" corresponds to a date/time condition, "PLACE" corresponds to a place condition, "TAG" corresponds to a tag condition, and "ALL" corresponds to all of the date/time, place, and tag conditions. Further, a next status ID indicates a status to which the status transitions after an operation input is performed. Here, "CURRENT" means that status transition is not performed. Further, operation input information corresponds to each button of the remote controller 1200. For example, "NEXT" corresponds to the left scroll button 420, "PREV" corresponds to the right scroll button 410, "DATE" corresponds to the date/time condition selection button 1201, "PLACE" corresponds to the place condition selection button 1202, and "TAG" corresponds to the tag condition selection button 1203. Similarly, "SKIP_NEXT" corresponds to the next skip button 1220, and "SKIP_PREV" corresponds to the previous skip button 1210. Note that in the case where data is searched for and browsed based on grouping, status ID information is used as information for specifying a group.

Further, read condition information indicates a condition for reading data, and "index" indicates the index for when performing sorting, "sort" indicates the sort order, "date" indicates a designation date/time, "place" indicates a designation place, and "tag" indicates a designation tag. Further, data in parentheses indicates a designation date/time condition. For example, if "SKIP_NEXT" is operated in the "PLACE" status, a read condition is written as "place=place (next)", which indicates that a content that has place information following the place information of a focus content is read. Also, sort="+place, +date" indicates that contents are sorted in the place order, and further the sorted contents corresponding to each place are sorted in the date/time order. Note that the model information 1400 is an illustration of an example, and there is no limitation to this. For example, although status IDs indicate sort conditions, status IDs may indicate grouping conditions. As described above, rule information used in the second embodiment is information that indicates criteria (sort conditions, grouping conditions) for determining the order in which data is listed used for data reading, and correspondence between the type of access operation (operation inputs) and a data read condition for each criterion.

FIG. 12 is a diagram showing an example of an operation sequence in the data access system according to the second embodiment. In FIG. 12, as a response to the model request 801, a model ID 1502, which is information for uniquely identifying a model, is returned. In the second embodiment, it is assumed that the data storage apparatus 100 has stored a plurality of model information pieces including the model information 1400 in association with the model IDs. A plurality of model information pieces is stored in the ROM 202, for example. Further, status information 1503 sent from the data display apparatus 110 to the data storage apparatus 100 includes status ID information, and date information, place information, and tag information of a focus content, and is written in XML format. Note that status ID information corresponds to a status ID in the model information 1400, and is information indicating the criterion that is currently used in the data display apparatus 110.

Figure 13A:
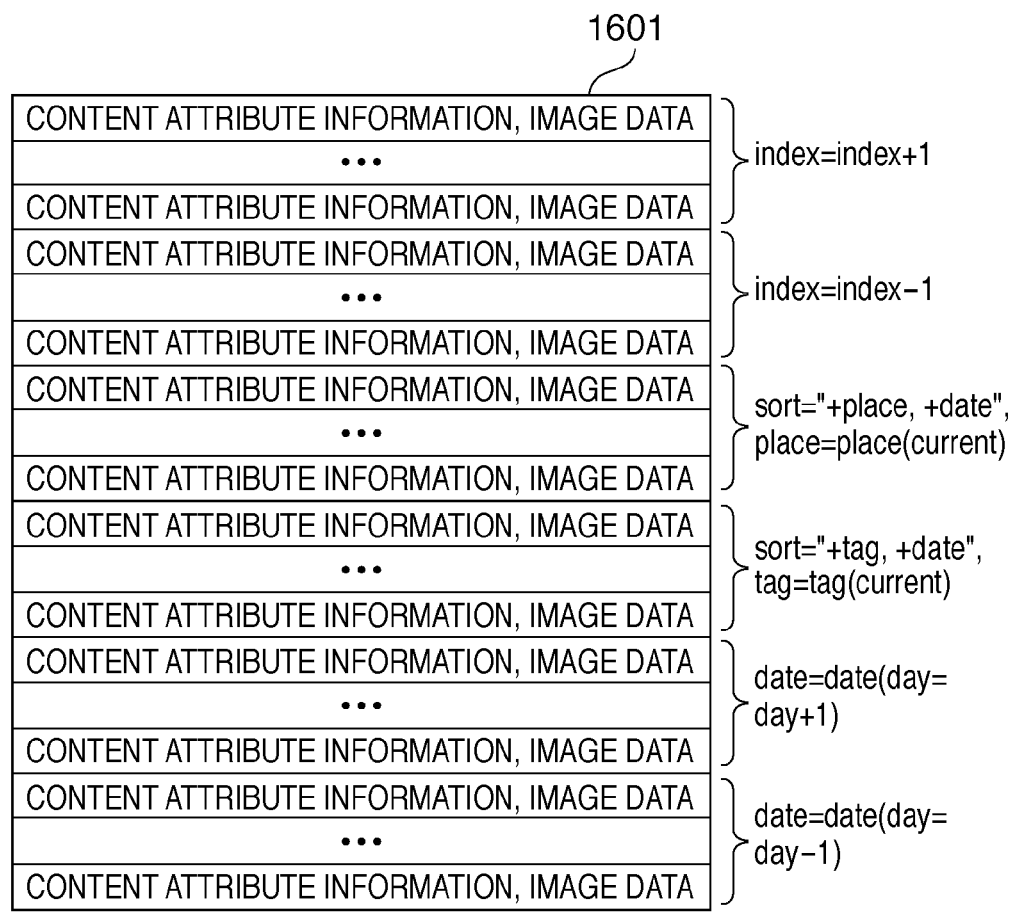
FIGS. 13A and 13B are diagrams showing examples of temporary storage data in the data storage apparatus according to the embodiment.
Figure 13B:
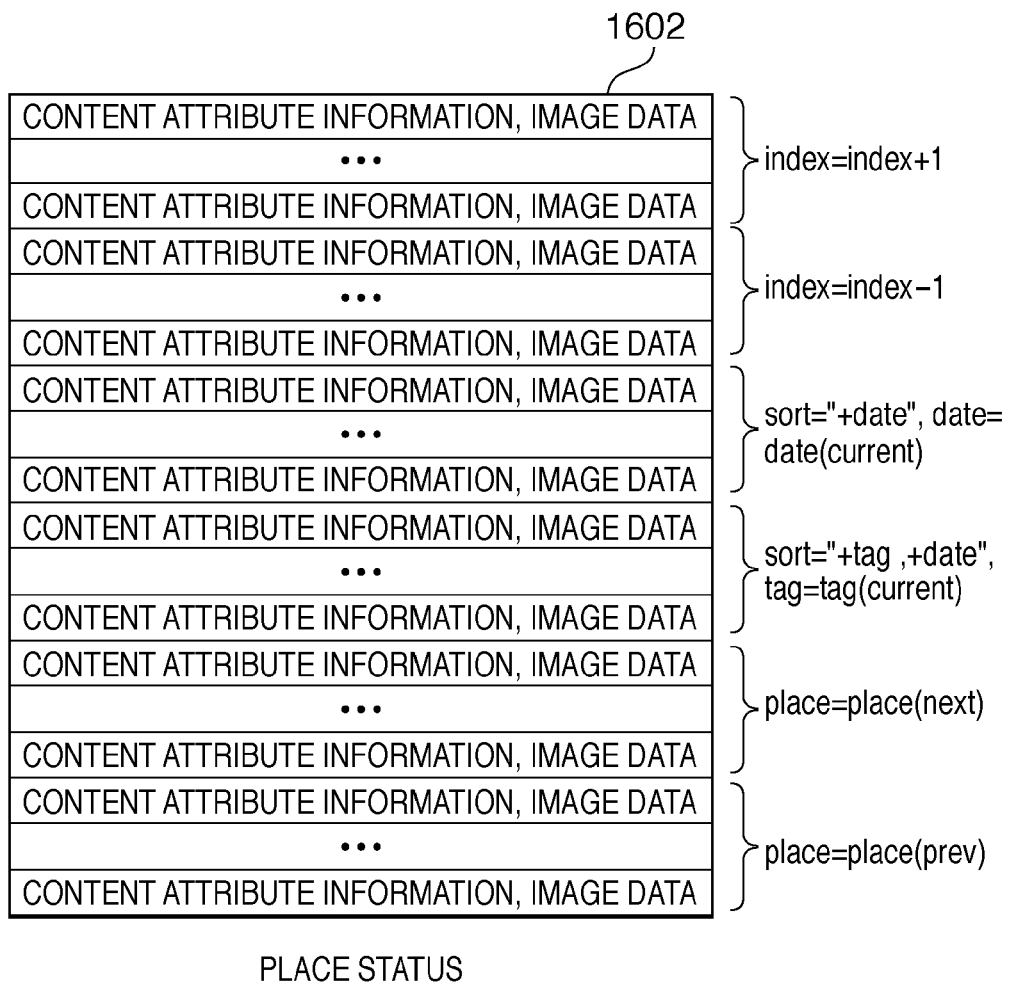

FIGS. 13A and 13B show examples of temporary storage data held in the temporary data storage unit 611 of the data storage apparatus 100 according to the second embodiment. In the second embodiment, instead of the temporary storage data 900, temporary storage data (1601, 1602) shown in FIGS. 13A and 13B is temporarily stored. In FIG. 13A, reference numeral 1601 denotes temporary storage data in the status where "date/time" is selected by pressing the date/time condition selection button 1201. Further, reference numeral 1602 in FIG. 13B denotes temporary storage data in the status where "place" is selected by pressing the place condition selection button 1202. Both of the temporary storage data pieces 1601 and 1602 are configured by attribute information and image data of contents in accordance with predetermined conditions.

In the temporary storage data 1601 in DATE status, data that meets a read condition for which a status ID in the model information 1400 is "ALL" or "DATE" is pre-read, and temporarily stored. Similarly, in the temporary storage data 1602 in PLACE status, data that meets a read condition for which a status ID in the model information 1400 is "ALL" or "PLACE" is pre-read, and temporarily stored. Therefore, in a date selection status, for example, data corresponding to "date=date (day=day+1)" or "date=date (day=day-1)" is temporarily stored. Further, in a place selection status, for example, data corresponding to "place=place (next)" or "place=place (prey)" is temporarily stored. Note that the temporary storage data pieces 1601 and 1602 are illustrations of examples, and there is no limitation to these.

Figure 14B:
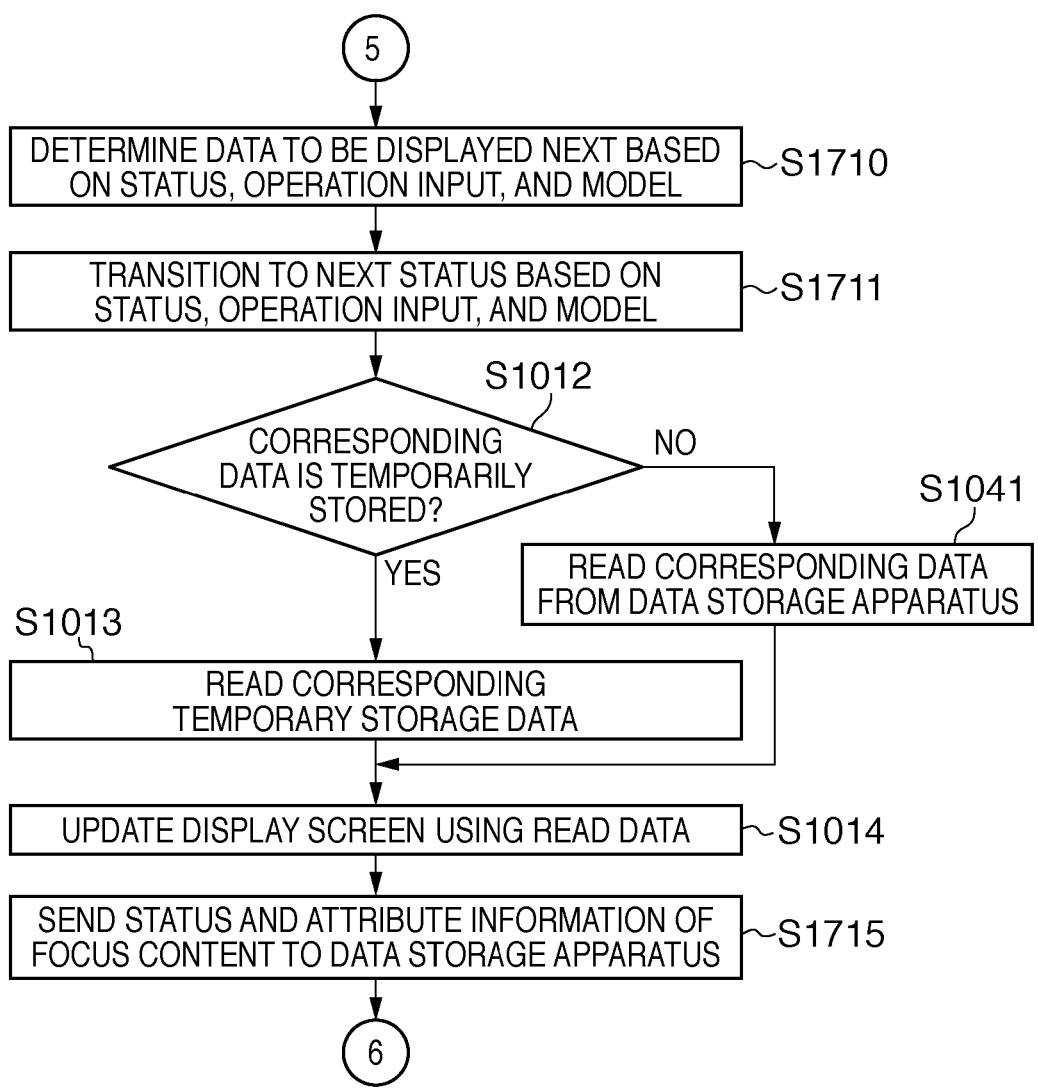

FIGS. 14A and 14B are flowcharts showing processing performed by the data display apparatus 110 according to the second embodiment. It is assumed that data display apparatus processing starts immediately after the power to the data display apparatus 110 is turned on, and continues until the power is turned off.

In FIGS. 14A and 14B, if an operation input is detected (Yes in S1003), the data read request sending processing/temporary storage unit 602 determines data to be displayed next based on the condition that is selected (status ID in the model information 1400), the operation input, and the model information 1400 (S1710). Then, based on the status ID, the operation input, and the model information 1400, the status transitions to the next status (status designated by the next status ID) (S1711). After that, processing in S1012 to S1014 is executed, which is as described in the first embodiment. Then, subsequent to S1014, the data read request sending processing/temporary storage unit 602 sends the status ID and attribute information of a focus content to the data storage apparatus (S1715), and the processing returns to S1004. Further, in response to the model request 801 from the data storage apparatus 100, the status sending unit 606 sends the model ID 1502 of the model information that is being used (S1004, S1731).

Figure 15A:
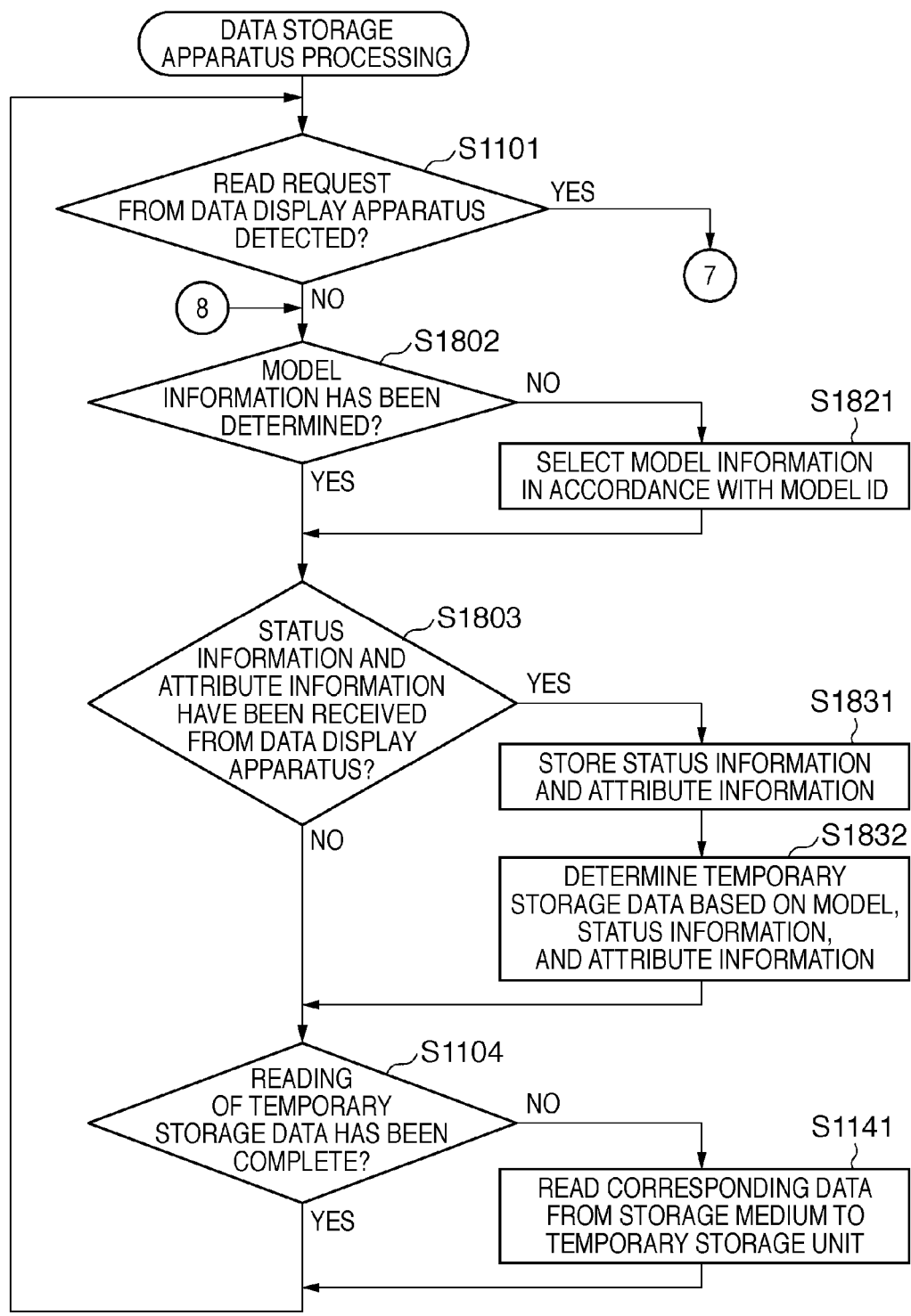
FIGS. 15A and 15B are flowcharts showing processing performed by the data storage apparatus according to the embodiment.
Figure 15B:
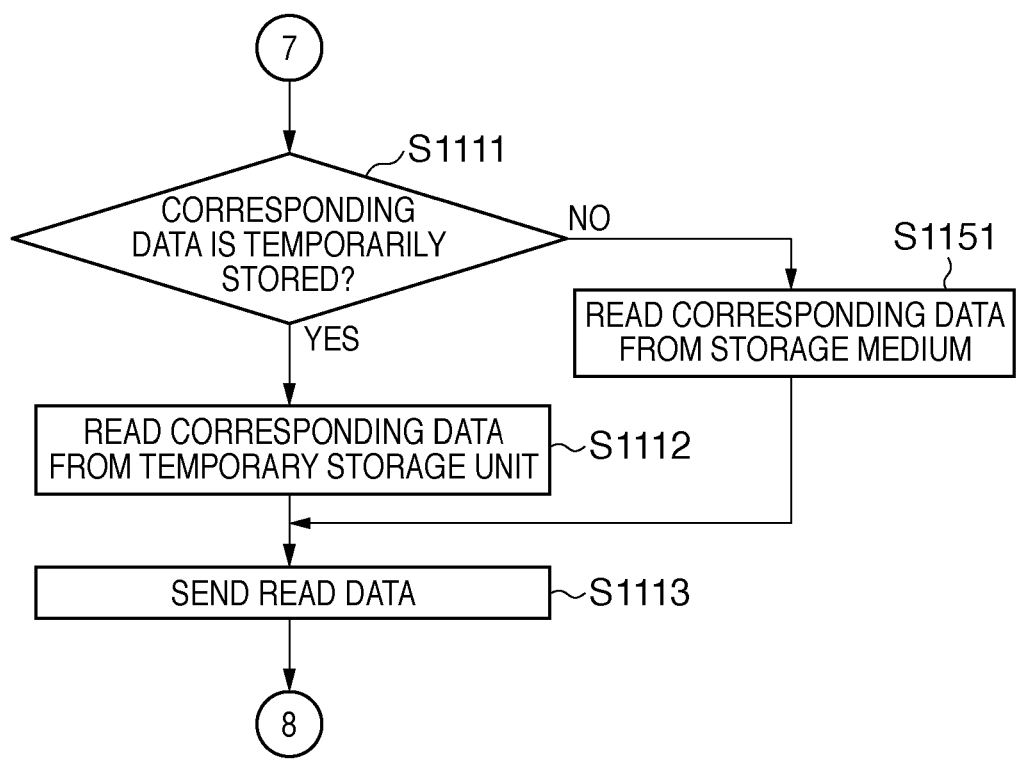

FIGS. 15A and 15B are flowcharts showing processing performed by the data storage apparatus 100 according to the second embodiment. It is assumed that data storage apparatus processing starts immediately after the power to the data storage apparatus 100 is turned on, and continues until the power is turned off.

In FIGS. 15A and 15B, the model receiving unit 615 determines whether model information to be used has been determined in accordance with the model ID from the data display apparatus 110 (S1802). If it is determined that model information has not been determined, the model receiving unit 615 issues the model request 801, receives the model ID 1502 sent from the data display apparatus 110 in response to this request, and selects model information corresponding to the received model ID (S1821). In the present embodiment, since the data storage apparatus 100 holds a plurality of information pieces including the model information 1400, model information to be used (in this example, the model information 1400) is selected in accordance with model identification information sent from the data display apparatus 110.

Subsequent to S1802, the status receiving unit 616 determines whether or not status ID information and attribute information have been received from the data display apparatus 110 (S1803). If it is determined in S1803 that the information pieces have been received (Yes in S1803), the status receiving unit 616 stores the status ID information and the attribute information (S1831). The pre-read data determining unit 613 determines temporary storage data to be pre-read, based on the selected model information 1400, the status ID information, and the attribute information (S1832). After that, the processing returns to S1104. Specifically, in first acquisition processing for acquiring rule information in the second embodiment, rule information corresponding to the identification information received from the data display apparatus 110 is acquired from a storage unit (not shown) in which plural types of rule information pieces are stored in association with identification information.

The following is a description of a more specific example with regard to a method for determining data to be pre-read in S1832. For example, if the status of the user interface is as shown in FIG. 3A, since the operation target is "date/time", the status ID is "DATE", the shooting date/time is "Apr. 23, 2003 13:46", the place is "Okinawa", and the tag is "travel". Therefore, all the contents will be read that meet read conditions for which a status ID corresponds to "ALL" or "DATE", specifically, as shown in FIG. 13A, all the contents will be read that correspond to:
index=index+1;
index=index-1;
sort="+place, +date", place=place (current);
sort="+tag, +date", tag=tag (current);
date=date (day=day+1); or
date=date (day=day-1).

Note that in the case of a status where the shooting date/time of a focus content is "2003/4/23", the place is "Okinawa", and further contents are displayed in the date/time order, for
"sort="+place, +date", place=place (current), contents corresponding to "Okinawa" are determined as being pre-read data in the order of shooting date/time. If the last content corresponding to "Okinawa" is determined as being pre-read data, subsequently, contents corresponding to "Kagoshima" are determined as being pre-read data in the order of shooting date/time. When "place" is replaced with "tag" in the above description, similar processing will also be performed with respect to "sort="+tag, +date", tag=tag" (current).

Further, places are listed, as "Enoshima", "Okinawa", and "Kagoshima", for instance, in the order of the Japanese syllabary, and if place information of a focus content indicates "Okinawa", in FIG. 13B,
for "place=place (next)", a predetermined number of contents in ascending/descending order from the initial content corresponding to the following place in the order of the Japanese syllabary, that is, "Kagoshima" are determined as being pre-read data, and
for "place=place (prey)", a predetermined number of contents in ascending/descending order from the initial content corresponding to the previous place, that is, "Enoshima" are determined as being pre-read data.

According to the second embodiment, the data storage apparatus 100 acquires the model information 1400, a status ID, and attribute information of a focus content from the data display apparatus 110, thereby enabling appropriate data pre-reading in response to user operation. Accordingly, it is possible to pre-read appropriate data to the high-speed readable temporary data storage unit. Therefore, it is possible to increase the speed of response of the data storage apparatus 100 with respect to a data read request from the data display apparatus 110. Further, the model information 1400 is read by sending and receiving only identification information, thus enabling sending and receiving processing to be simplified and performed at higher speed.

Third Embodiment

Next, a third embodiment is described in detail with reference to the attached drawings. Note that the system configuration, the hardware configuration, the display screen, attribute information of remote controller contents, and model information are similar to those in the first embodiment (FIGS. 1, 2, 3A, 4A, 5, 7A). Further, in the following, unless otherwise stated, the same numerals are given to elements described with reference to other diagrams, and a description thereof is omitted.

Figure 16:
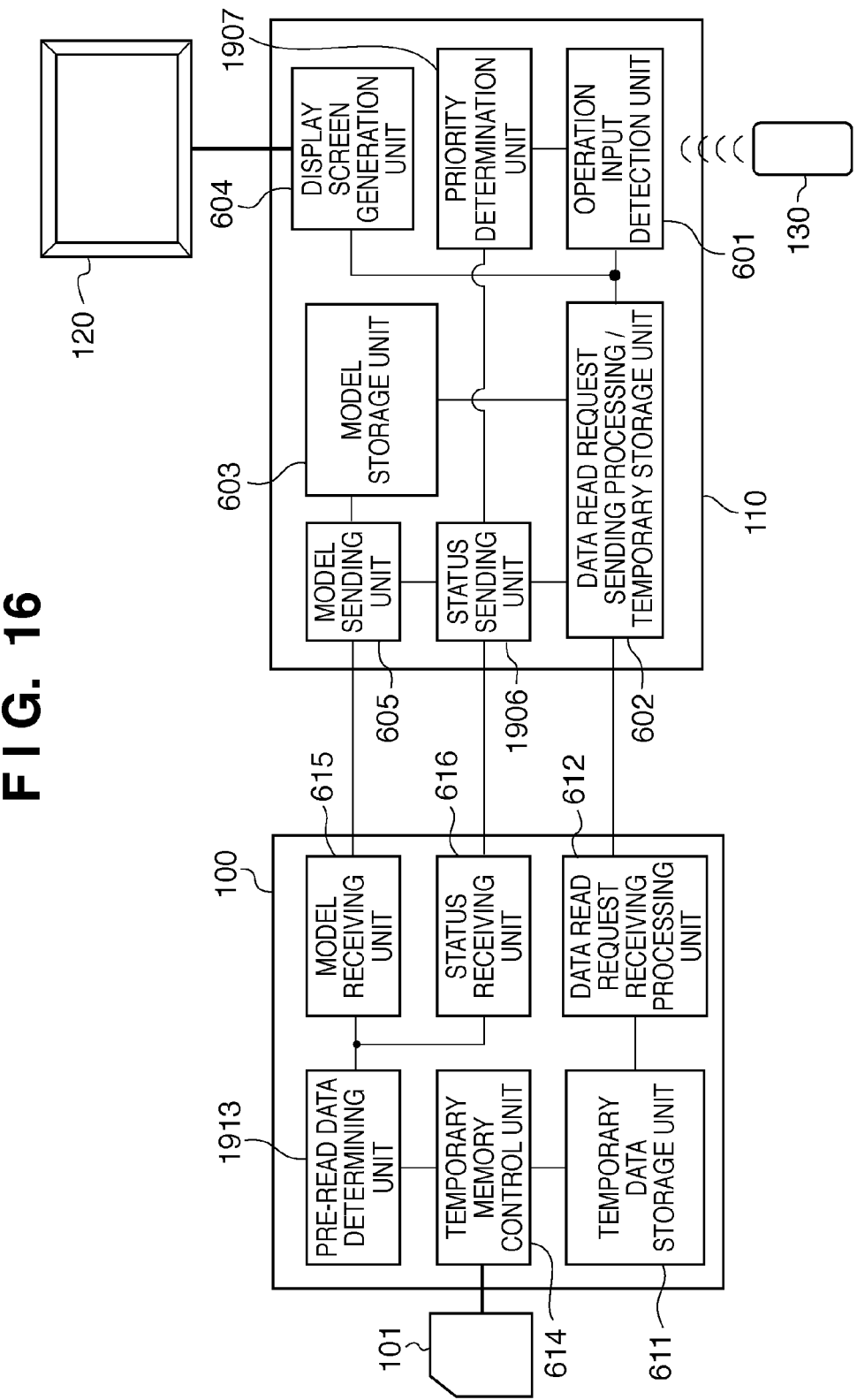
FIG. 16 is a block diagram showing an example of a function configuration of the data access system according to the embodiment.

FIG. 16 is a block diagram showing an example of a function configuration of a data access system according to the third embodiment. In FIG. 16, reference numeral 1907 denotes a priority determination unit that determines the priority of operation contents of the model information 700, based on the history of operation inputs detected by the operation input detection unit 601. Further, a status sending unit 1906 also sends priority information determined by the priority determining unit 1907 to the data storage apparatus 100, as status information, in addition to attribute information of a focus content. A pre-read data determining unit 1913 of the data storage apparatus 100 determines data to be pre-read and temporarily stored in the temporary data storage unit 611, based on the model information 700, and the attribute information of a focus content and the priority information received via the status receiving unit 616.

FIG. 17 is a diagram showing an example of an operation sequence in the data access system according to the third embodiment. In FIG. 17, status information 2003 including date/time information and priority information of a focus content is sent in XML format. Here "<priority>" is a tag for identifying priority information, and "NEXT:5, PREV:3" indicates that a read condition for operation input "NEXT" has priority over that for "PREV" in the ratio of 5 to 3. Priority "NEXT:5, PREV:3" is set in the case where the next content is consecutively displayed without the user performing a skip operation, for example.

Figure 18A:
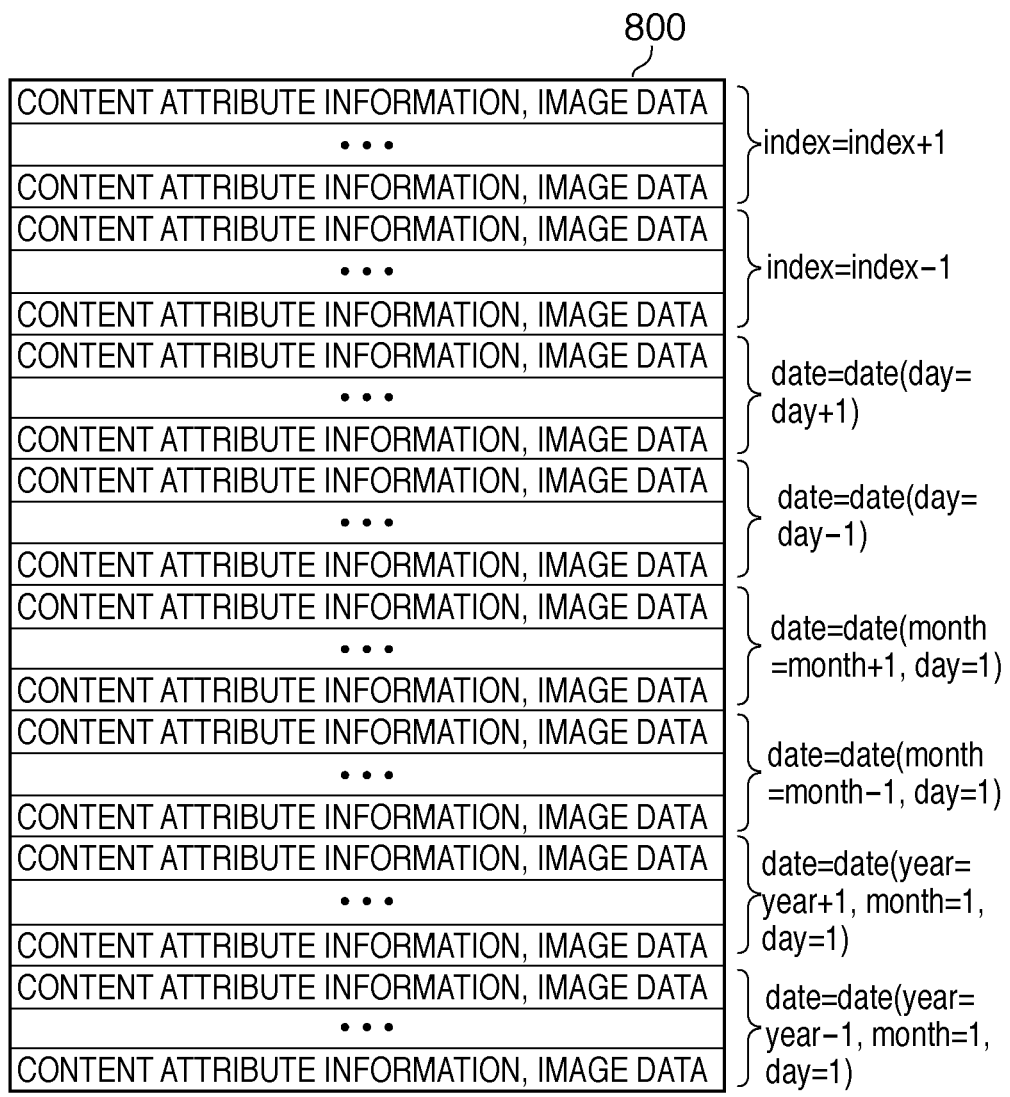
FIGS. 18A and 18B are diagrams showing examples of temporary storage data in the data storage apparatus according to the embodiment.
Figure 18B:
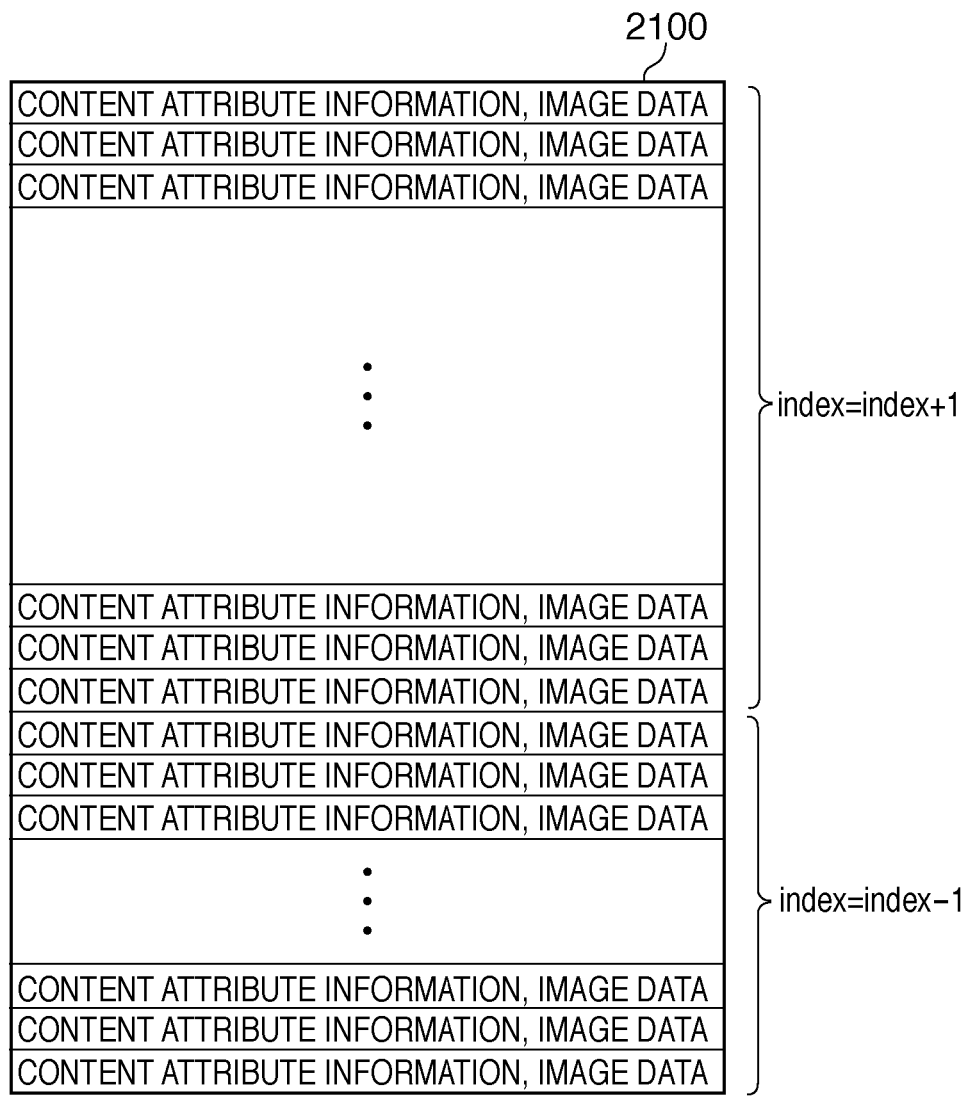

FIGS. 18A and 18B are diagrams showing an example of temporary storage data that is stored in the temporary data storage unit 611 of the data storage apparatus 100 according to the third embodiment. In FIG. 18B, reference numeral 2100 denotes temporary storage data in the case where priority is "NEXT:5, PREV:3". In the temporary storage data 2100, a read condition "index=index+1" corresponding to "NEXT" in the model information 700, and a read condition "index=index−1" corresponding to "PREV" are preferentially stored temporarily, with memory distribution of 5 to 3. Specifically, the pre-read data determining unit 1913 and the temporary memory control unit 614 adjust the amount of pre-read data corresponding to an access operation stored in the temporary data storage unit 611, according to the priority given to each access operation.

Figure 19A:
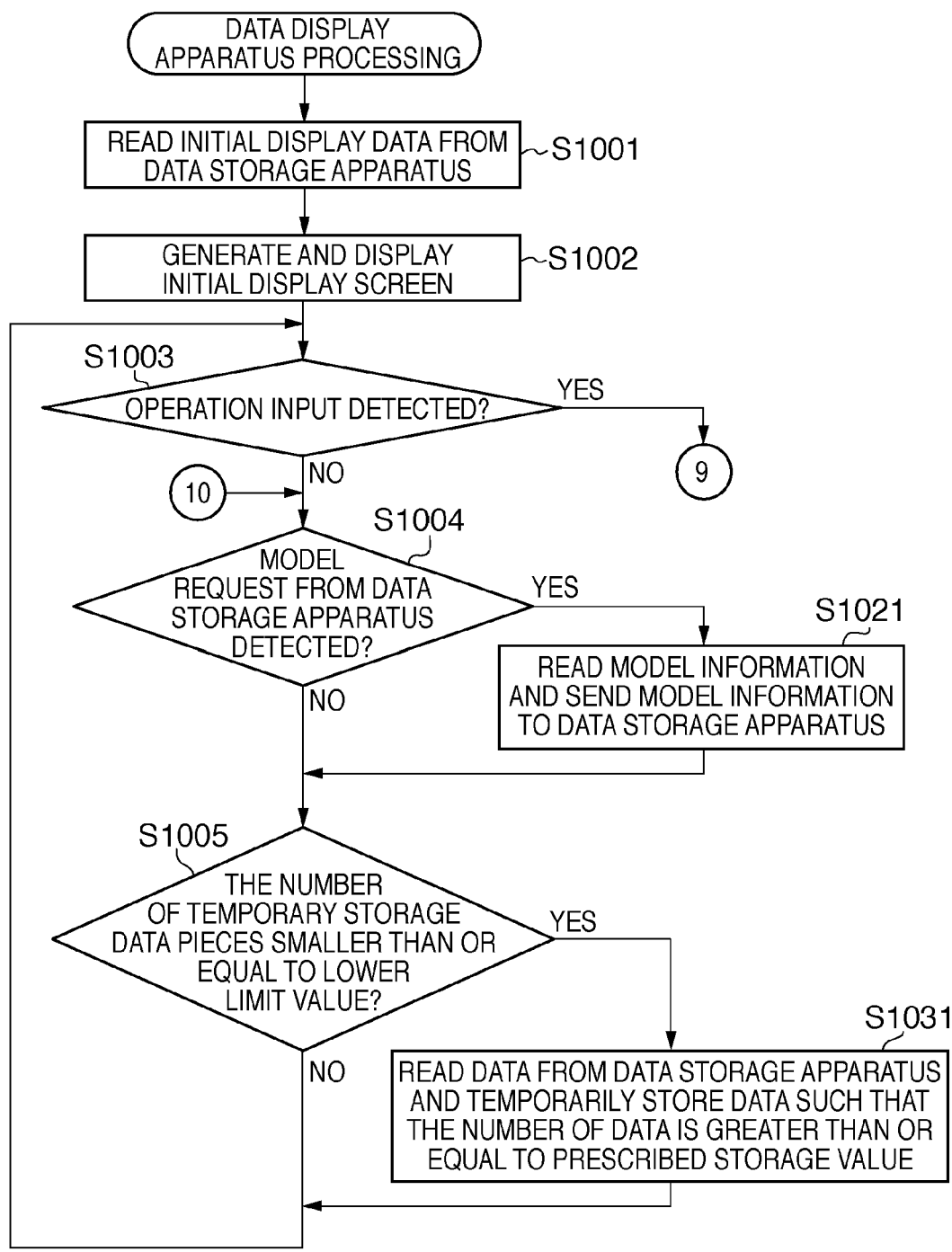
FIGS. 19A and 19B are flowcharts showing processing performed by the data display apparatus according to the embodiment.
Figure 19B:
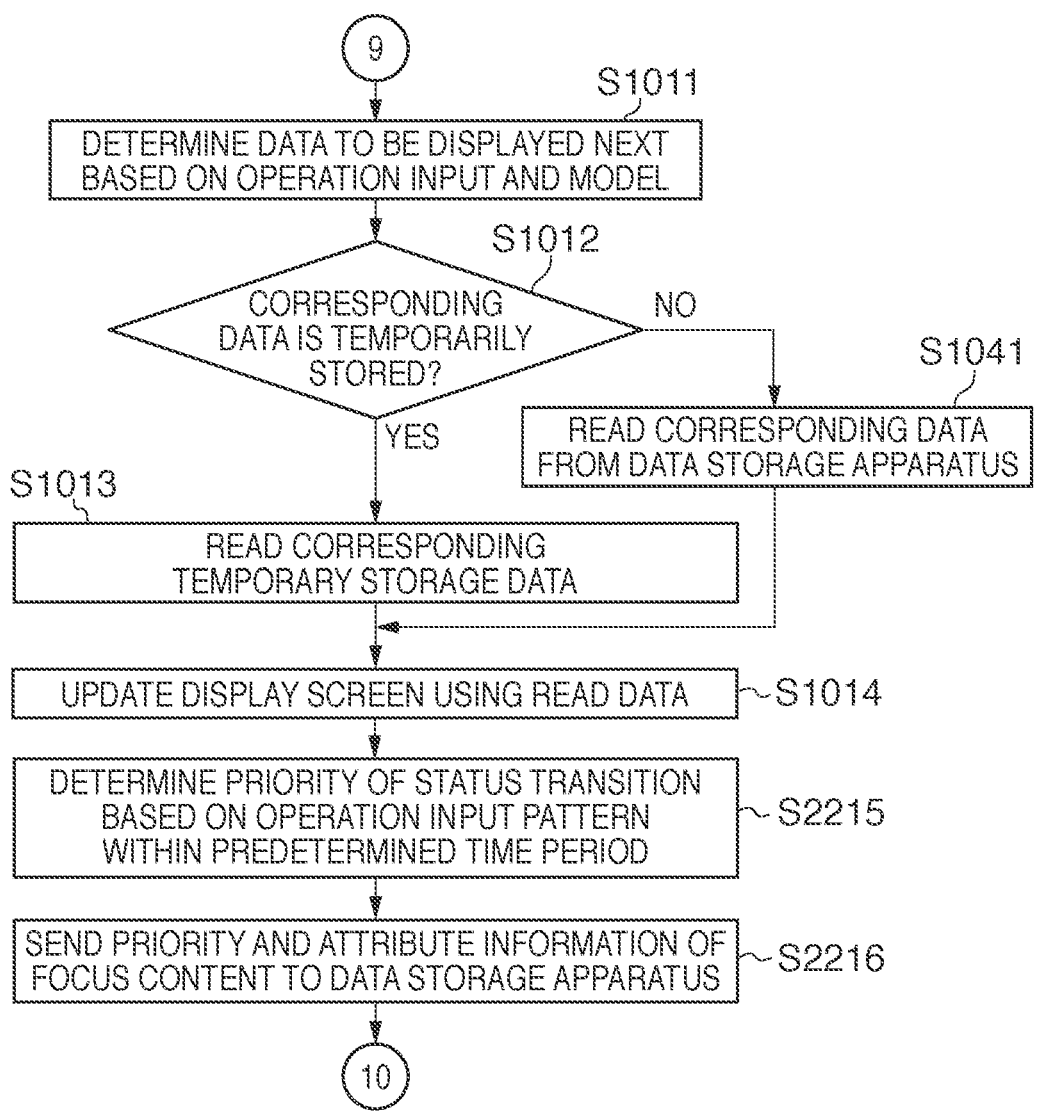

FIGS. 19A and 19B are flowcharts showing processing performed by the data display apparatus 110 according to the third embodiment. In FIGS. 19A and 19B, subsequent to S1014, the priority determination unit 1907 determines the priority of status transition, based on an operation input pattern within the predetermined time period detected by the operation input detection unit 601 (S2215). Then, the status sending unit 1906 sends the priority determined by the priority determination unit 1907, and attribute information of a focus content to the data storage apparatus 100 (S2216). After that, the processing returns to S1004.

Figure 20A:
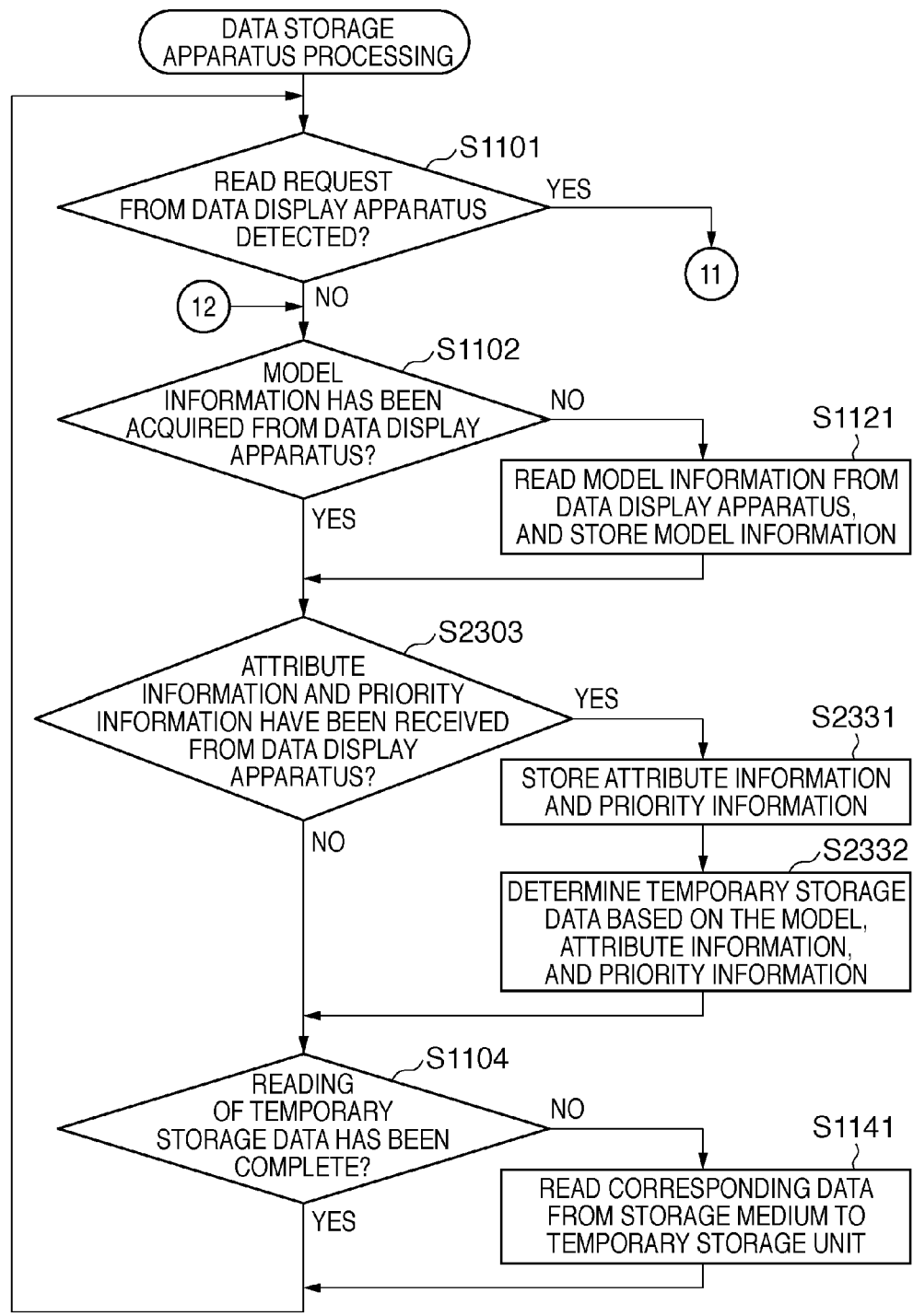
FIGS. 20A and 20B are flowcharts showing processing performed by the data storage apparatus according to the embodiment.
Figure 20B:
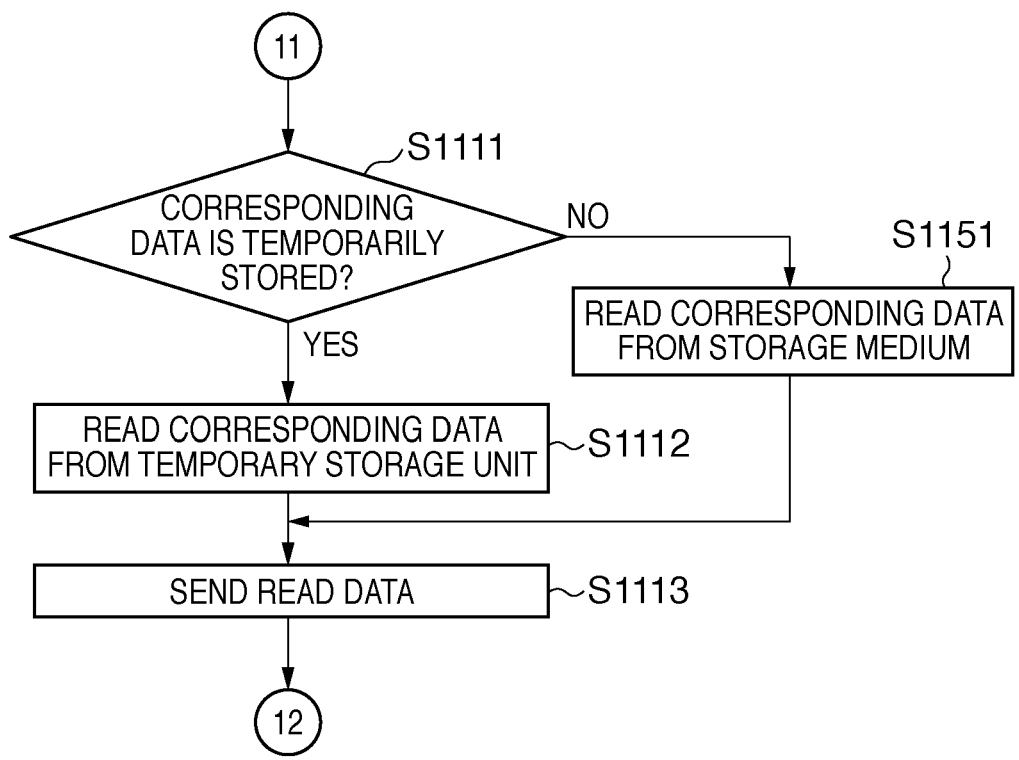

FIGS. 20A and 20B are flowcharts showing processing performed by the data storage apparatus 100 according to the third embodiment. In FIGS. 20A and 20B, subsequent to S1102, the status receiving unit 616 determines whether attribute information and priority information have been received from the data display apparatus 110 (S2303). If it is detected in S2303 that the information pieces have been received (Yes in S2303), the status receiving unit 616 stores the attribute information and the priority information that have been received (S2331). Then, the pre-read data determining unit 1913 determines temporary storage data to be pre-read based on the model information 700, the attribute information, and the priority information (S2332). After that, the processing returns to S1104. For example, in the pre-reading with respect to "index=index+1" and "index=index−1", in the case where the "predetermined number" is 16, if priority is not given, 16 contents are pre-read for "NEXT" and "PREV" each, in ascending/descending order. Then, if read conditions are changed to the ratio of 5 to 3 in consecutive operation, 20 contents in the "NEXT" direction and 12 contents in the "PREV" direction are pre-read.

As described above, according to the third embodiment, the data storage apparatus 100 acquires the model information 700 and attribute information of a focus content from the data display apparatus 110, and thus it is possible to pre-read appropriate data to the high-speed readable temporary data storage unit. Therefore, it is possible to increase the speed of response of the data storage apparatus 100 with respect to a data read request from the data display apparatus 110.

Moreover, priority information determined based on the operation input is also sent from the data display apparatus 110, and the data storage apparatus 100 performs pre-reading, further taking this priority information into consideration. Accordingly, appropriate pre-reading is possible according to an operation status, and thus a temporary storage medium resource and the time for temporary memory control can be utilized effectively.

According to the present invention, data can be pre-read appropriately when performing data access based on condition designation, and thus the speed of response to data access can be improved.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-135355, filed Jun. 4, 2009, which is hereby incorporated by reference herein in its entirety.

What is claimed is:

1. An information processing apparatus that outputs data in response to a data access request from an external device, the information processing apparatus comprising:
a first acquisition unit configured to acquire, from the external device, rule information that the external device uses when performing data access and that defines a relation between a type of operation input performed by a user and a data read condition;

a second acquisition unit configured to acquire status information that includes attribute information of data that is displayed as a focus content on the external device, and indicates a current display status of the external device;

a temporary memory control unit configured to determine, based on the rule information and the status information, data to be pre-read from a storage medium and stored in a temporary data storage unit, read the determined data from the storage medium, and store the read data in the temporary data storage unit; and an output unit configured, in a case where a data access request is received from the external device, if the requested data is stored in the temporary data storage unit, to read the requested data from the temporary data storage unit, and output the read data to the external device, and if the requested data is not stored, to read the requested data from the storage medium, and output the read data to the external device.

2. The information processing apparatus according to claim 1, wherein the rule information is information that indicates a correspondence between a type of operation input and a data read condition for each sort condition for sorting data, and the status information further includes information that indicates a current sort condition used by the external device.

3. The information processing apparatus according to claim 1, wherein the first acquisition unit receives the rule information from the external device.

4. The information processing apparatus according to claim 1, further comprising a storage unit configured to store plural types of rule information pieces in correspondence with identification information, wherein the first acquisition unit receives identification information that indicates rule information to be used from the external device, and acquires rule information corresponding to the received identification information from the storage unit.

5. The information processing apparatus according to claim 1, wherein the status information is at least a portion of attribute information of data that is displayed as a focus content on the external device.

6. The information processing apparatus according to claim 1, wherein the status information includes information that indicates a priority of an access operation acquired by the external device based on a history with regard to an operation input, and the temporary memory control unit determines data to be pre-read from the storage medium and stored in the temporary data storage unit further using the priority.

7. The information processing apparatus according to claim 1, wherein the second acquisition unit sets the data requested by the data access request as a focus content, and acquires attribute information of the data as the status information.

8. An information processing apparatus that acquires data from an external device, the information processing apparatus comprising:

a holding unit configured to hold rule information that is used when performing data access and that defines a relation between a type of access operation and a data read condition;

a notifying unit configured to notify the external device of the rule information;

a sending unit configured to send, to the external device, status information that includes attribute information of data that is currently displayed, and indicates a current display status of the information processing apparatus; and an acquisition unit configured to acquire, by determining an attribute of data to be acquired based on the rule information according to an operation input, and sending the determined attribute to the external device, data according to the access operation from the external device.

9. The information processing apparatus according to claim 8, further comprising a generation unit configured to generate priority information that indicates a priority of an operation input based on a history of received operation inputs, wherein the sending unit sends the status information and the priority information to the external device.

10. A data access system that includes a data storage apparatus and a data access apparatus, the data access system comprising:

a holding unit configured to hold rule information that is used when performing data access and that defines a relation between a type of operation input and a data read condition, in the data access apparatus;

a notifying unit configured to notify an external device of the rule information, in the data access apparatus;

a sending unit configured to send, to the data storage apparatus, status information that includes attribute information of data that is currently displayed, and indicates a current display status of the data access apparatus, in the data access apparatus; and an acquisition unit configured to acquire, by determining an attribute of data to be acquired based on the rule information according to an operation input, and sending an access request including the determined attribute to the data storage apparatus, data according to the operation input from the data storage apparatus, in the data access apparatus, wherein the data storage apparatus includes:

a temporary memory control unit configured to determine data to be pre-read from a storage medium and stored in a temporary data storage unit based on the rule information notified by the notifying unit and the status information sent by the sending unit, read the determined data from the storage medium, and store the read data in the temporary data storage unit; and an output unit configured to read the data requested by the access request from the temporary data storage unit if the requested data is stored in the temporary data storage unit, and read the requested data from the storage medium if the requested data is not stored in the temporary data storage unit, and output the read data to the external device.

11. A control method for an information processing apparatus that outputs data in response to a data access request from an external device, the method comprising:

a first acquisition step of acquiring, from the external device, rule information that the external device uses when performing data access and that defines a relation between a type of operation input performed by a user and a data read condition;

a second acquisition step of acquiring status information that includes attribute information of data that is displayed as a focus content on the external device, and indicates a current display status of the external device;

a temporary memory control step of determining, based on the rule information and the status information, data to be pre-read from a storage medium and stored in a temporary data storage unit, reading the determined data from the storage medium, and storing the read data in the temporary data storage unit; and an output step of, in a case where a data access request is received from the external device, if the requested data is stored in the data temporary storage unit, reading the requested data from the data temporary storage unit, and outputting the read data to the external device, and if the requested data is not stored, reading the requested data from the storage medium, and outputting the read data to the external device.

12. A control method for an information processing apparatus that acquires data from an external device, the method comprising:

a holding step of holding rule information that is used when performing data access and that defines a relation between a type of access operation and a data read condition;

a notifying step of notifying the external device of the rule information;

a sending step of sending, to the external device, status information that includes attribute information of data that is currently displayed, and indicates a current display status of the information processing apparatus; and an acquisition step of acquiring, by determining an attribute of data to be acquired based on the rule information according to an operation input, and sending the determined attribute to the external device, data according to the access operation from the external device.

13. A non-transitory computer-readable storage medium storing a program for causing a computer to execute steps of the control method for the information processing apparatus according to claim 11.

14. A non-transitory computer-readable storage medium storing a program for causing a computer to execute steps of the control method for the information processing apparatus according to claim 12.

* * * * *